(12) United States Patent
Thursfield et al.

(10) Patent No.: US 12,144,076 B2
(45) Date of Patent: Nov. 12, 2024

(54) IMMERSIVE OUTDOOR LIGHTING EMULATION

(71) Applicant: SIGNIFY HOLDING B.V., Eindhoven (NL)

(72) Inventors: Paul Philip Thursfield, Eindhoven (NL); Martinus Hermanus Wilhelmus Maria Van Delden, Venlo (NL); Ramon Eugene Franciscus Van De Ven, Eindhoven (NL); Lennart Yseboodt, Retie (BE)

(73) Assignee: SIGNIFY HOLDING B.V., Eindhoven (NL)

(*) Notice: Subject to any disclaimer, the term of this patent is extended or adjusted under 35 U.S.C. 154(b) by 191 days.

(21) Appl. No.: 17/922,353

(22) PCT Filed: Apr. 22, 2021

(86) PCT No.: PCT/EP2021/060600
§ 371 (c)(1),
(2) Date: Oct. 29, 2022

(87) PCT Pub. No.: WO2021/224019
PCT Pub. Date: Nov. 11, 2021

(65) Prior Publication Data
US 2023/0180361 A1 Jun. 8, 2023

(30) Foreign Application Priority Data

May 5, 2020 (EP) ..................................... 20172857

(51) Int. Cl.
*H05B 45/20* (2020.01)
*H05B 47/11* (2020.01)
*H05B 47/155* (2020.01)

(52) U.S. Cl.
CPC .............. *H05B 45/20* (2020.01); *H05B 47/11* (2020.01); *H05B 47/155* (2020.01)

(58) Field of Classification Search
CPC ........ H05B 45/10; H05B 45/20; H05B 47/10; H05B 47/11; H05B 47/155; H05B 47/16;
(Continued)

(56) References Cited

U.S. PATENT DOCUMENTS

2014/0292206 A1* 10/2014 Lashina ............... H05B 47/155
315/149
2016/0273723 A1* 9/2016 Van Gheluwe ....... F21S 19/005
(Continued)

*Primary Examiner* — Thai Pham

(57) ABSTRACT

A lighting system comprises a lighting arrangement (153) and a controller for controlling the lighting arrangement. The lighting arrangement comprises an artificial skylight (161-163) and a functional general lighting device (166,168) for providing horizontal light. The functional general lighting device comprises a horizontal luminous surface. The functional general lighting device is positioned in parallel and adjacent to the artificial skylight. A spacing between the functional general lighting device and the artificial skylight does not exceed the width of the artificial skylight. The controller is configured to control the artificial skylight and the functional general lighting device to render different light effects of a dynamic light scene. The dynamic light scene specifies a temporal sequence of light effects for each of a plurality of lighting devices, including the artificial skylight and the functional general lighting device.

14 Claims, 16 Drawing Sheets

(58) Field of Classification Search
CPC . H05B 47/19; F21V 9/02; F21V 21/03; F21S 8/00; F21S 8/02; F21S 8/026; F21S 19/005
See application file for complete search history.

(56) References Cited

U.S. PATENT DOCUMENTS

| | | | |
|---|---|---|---|
| 2018/0252374 A1* | 9/2018 | Keller | F21S 19/005 |
| 2018/0275498 A1* | 9/2018 | Takeshita | H05B 47/16 |
| 2019/0159317 A1* | 5/2019 | Harada | H05B 45/20 |

* cited by examiner

IMMERSIVE OUTDOOR LIGHTING EMULATION

CROSS-REFERENCE TO PRIOR APPLICATIONS

This application is the U.S. National Phase application under 35 U.S.C. § 371 of International Application No. PCT/EP2021/060600, filed on Apr. 22, 2021, which claims the benefit of European
Patent application Ser. No. 20/172,857.3, filed on May 5, 2020. These applications are hereby incorporated by reference herein.

FIELD OF THE INVENTION

The invention relates to systems for controlling lighting devices to provide immersive, natural lighting conditions as found in an outdoor environment in an indoor environment, such as in an office environment.

The invention further relates methods of controlling lighting devices to provide immersive, natural lighting conditions as found in an outdoor environment in an indoor environment.

The invention also relates to a computer program product enabling a computer system to perform such a method.

BACKGROUND OF THE INVENTION

In an outdoor environment, the interaction of natural daylight with its ambient environment results in all kinds of light across the sky and vegetation, with the dynamics, patterns, tonalities and intensities of the light being dependent upon geographic location, season, weather and time of day. Frequently, however, humans do not observe this interaction consciously, simply because the constant cycles and variation of nature are an integral part of humans' natural evolution and habitat. Nevertheless, humans are strongly connected to the emotional and biological benefits of natural light.

In an indoor environment, such as in (deep) open plan offices and hospitality areas, humans' access to natural light may be limited. For example, because persons are seated too far away from a window or because there is only a small window allowing little light in or because the natural light is diffuse (solar tube, milky glass, fog) or because there is no access to natural light at all. In all these cases, humans become to a greater or lesser extent disconnected from the constant cycles and variation nature.

In spaces (partially) deprived of natural light, the dynamics that are present in the outdoor environment are missing. Conventional lighting in an indoor environment, such as in an office building, is often static. Control options may be limited to on/off control or control of a dimming level (e.g. allowing dimming up to increase light intensity or dimming down to lower light intensity).

Conventional lighting devices are arranged in a grid-like structure and controlled individually or as a group in which they are controlled in an identical fashion (e.g. all on/off, all to a specific dimming level or all to a relative dimming level compared to a neighboring lighting device). Generally, the same type of lighting devices is used in a single room or zone. For example, an office space may comprise panel lighting fixtures of the same type in each room except for the corridor where downlights are used. To address different light level needs, the number of lighting devices and/or their placement may be adapted.

Light transmitting structures, such as (real) skylights, (real) windows and the like may be used to increase the amount of daylight that enters an indoor environment. Although light transmitting structures can increase a feeling of well-being of inhabitants of the indoor environment, they are costly and cannot be installed everywhere. Further, they may cause other issues, such as privacy and safety issues.

Artificial skylights and artificial windows have been proposed as a solution, as well as dynamic and static displays showing a view of clouds passing in the sky or other natural elements (e.g. a view of the forest or sea). However, these may actually draw attention to the fact that one is in an indoor environment and have an opposite effect, i.e. lower the feeling of well-being.

SUMMARY OF THE INVENTION

It is a first object of the invention to provide a system, which is able to provide enhanced emulation of (aspects of) an outdoor environment in an indoor environment.

It is a second object of the invention to provide a method, which is able to provide enhanced emulation of (aspects of) an outdoor environment in an indoor environment.

In a first aspect of the invention, a lighting system comprises a lighting arrangement and a controller for controlling said lighting arrangement, wherein said lighting arrangement comprises an artificial skylight and a functional general lighting device for providing horizontal light, said functional general lighting device comprising a horizontal luminous surface, said functional general lighting device being positioned in parallel and adjacent to said artificial skylight, and a (visible) spacing between said functional general lighting device and said artificial skylight not exceeding the width of said artificial skylight, and said controller is configured to control said artificial skylight and said functional general lighting device to render different light effects of a dynamic light scene, said dynamic light scene specifying a temporal sequence of light effects for each of a plurality of lighting devices, said plurality of lighting devices including said artificial skylight and said functional general lighting device.

There is more to an immersive and natural feeling light experience than meets the eye at first glance. The main objective of conventional lighting systems is to provide at least a minimum and uniform (artificial) level of illumination at the working surfaces, across an office space. Conventional (and identical) lighting devices are predominantly arranged in clearly recognizable and regular patterns across the ceiling of a given office space. Normally, it does not matter which (identical) lighting device is installed where, because they are interchangeable.

Interestingly, when a number of conventional lighting devices is replaced by a much larger luminous surface, for example a Philips OneSpace luminous ceiling panel, the look and feel of the whole space is positively transformed. Similarly, the lighting devices of a natural lighting system could also be distributed regularly across an office space. However, when the light output of the artificial skylight also renders the variation and cycles of nature (circadian rhythm and/or weather) throughout the day and/or season, the light levels within the space can dramatically vary as well. Worse, at some point, if these devices are the only source of functional light, the light level may drop below the office norm, for example during cloudy days, or in early morning and late noon hours.

Hence, it makes more sense to deploy light devices having dedicated functions with for example at least one lighting device providing the variations and cycles of nature whilst other devices provide functional light and a realistic view to the sky. For function separated lighting devices, however, the different lighting devices can be arranged in many ways. However, as stated before, some arrangements are more favorable than others, in particular when a plurality of different lighting devices need to work together as one system. Besides architectural ceiling aesthetics, there are other reasons why one particular arrangement of a plurality of lighting devices is preferred over another arrangement, including:

Nature is a continuum. Hence, when its artificial cousins come as an arrangement of (natural feeling), yet, separated entities, the collective feel and the level of experience declines.

Nature is about natural feeling clusters of diversity. Hence, it is rather important that the ensemble of a plurality of different lighting devices feels as a natural (connected) cluster.

Nature is about harmonic feeling light scenes when being viewed directly. Thus, the power of a single and isolated entity can be far less powerful than a cluster of similar entities, i.e. a skylight on its own is far less powerful than a set of identical devices, increasing the level of illusion. When in addition each of the skylights also comes with its own subset of information, like suggested solar shadows, sharp angles, and the feel of infinity, the level of excitement increases even more.

Nature is about (very large sized) illumination in the sky. Thus, the presence of the illumination at the ceiling is important, with large luminous surfaces feeling much more powerful and pleasant than a pattern of separated light tiles and/or lines providing the same level of illumination.

The combination of different entities in a cluster can be more powerful than the sum of the individual contributions, i.e. the combination of a skylight and a functional lighting device in proximity is much more powerful than an integrated lighting device providing the same.

The effect of one plus one can be much more than two. Although an isolated artificial skylight can look and feel like its natural cousin, the experience of a plurality of identical devices is much more powerful, in particular when combined with functional lighting device in close proximity, even more particularly, in combination with large luminous surfaces, for example the One Space and/or large light tiles.

It may take more than one skylight to provide the sensation of daylight, i.e. daylight is much more than a hole in the ceiling. With a single artificial skylight, a person may even feel remote from the daylight, in particular for smaller sized (artificial) skylights. This unpleasant feeling can be completely flipped around in the presence of a large luminous surface that operated at a light level that is harmonized to that of the artificial skylight. In this manner, a natural feeling illusion of a setting sun in an else sufficiently lit office can be recreated.

Beneficially, close proximity operation and installation of function different lighting devices also helps in resolving the challenges in glare, in particular in office environments, in that the blue light emitted by the skylight needs to be intense to feel real. Hence, when skylights and large luminous surfaces are installed in close proximity, both can be operated natural and bright, without causing issues.

In close proximity, the blue/cyan light of the skylight fills the "green gap" of conventional white LED light sources, thereby increasing the overall Color Rendering Index (CRI). At the same time the blue light also contributes to the biological light component. Beneficially, the CCT of the functional lighting devices in proximity to a skylight can also be increased, to provide much cooler CCTs (well beyond 4000 K up to 5500 K) without the space becoming unpleasant (when compared to an installation of the same number of devices more spaced apart (the natural feeling cluster breaks-up into separate entities)). Even more beneficially, cooler CCTs also come with an increased energy saving in that higher CCT LEDs are more efficient than lower CCT white LEDs, as well as that cooler CCTs also contribute more to the biological light component (the health and well-being component of the system). The controller may thus control the skylight to render a blue/cyan light and, at the same time, control the functional general lighting device to render light with a color temperature between 4000 K and 5500 K, as part of the dynamic light scene (e.g. for a time period in a circadian scene or for a concentration or focus scene).

With the system described above, one or more of these advantages may be achieved and a sufficient amount of functional light may be provided while also emulating natural lighting in a manner that avoids the unpleasant feeling of a single artificial light (without neighboring functional light), i.e. without making persons feel remote from the daylight.

Said lighting arrangement may be configured to be installed within an existing suspended ceiling grid and/or suspended from a ceiling. The width of said functional general lighting device may be chosen such that it is at least half of the width of said artificial skylight. Said (visible) spacing between said functional general lighting device and said artificial skylight may be chosen such that does not exceed five centimeters. Preferably, the (visible) spacing is as small as (reasonably) possible.

Said plurality of devices may further comprise a peripheral lighting device for providing dynamic and vertical illumination and said controller may be configured to control said artificial skylight, said functional general lighting device and said peripheral lighting device to render different lights effects of said dynamic light scene. Said peripheral lighting device may be attached to or suspended from said lighting arrangement.

Said lighting arrangement may comprise a further artificial skylight and said functional general lighting device may be positioned in parallel and adjacent to said further artificial skylight, a (visible) spacing between said functional general lighting device and said further artificial skylight not exceeding the width of said further artificial skylight.

Said lighting arrangement may comprise a further functional general lighting device, said further functional general lighting device being positioned in parallel and adjacent to said artificial skylight on a different side than said functional general lighting device and a (visible) spacing between said further functional general lighting device and said artificial skylight not exceeding the width of said artificial skylight.

Said lighting arrangement may comprise a first edge functional general lighting device adjacent to a first end of said artificial skylight in the length direction and/or a second edge functional general lighting device adjacent to a second end of said artificial skylight in the length direction.

Said controller may be configured to control said functional general lighting device at a light level that is harmonized to a light level at which said artificial skylight is controlled.

Said controller may be configured to control said artificial skylight to render blue and/or cyan light and said functional general lighting device to render light with a color temperature between 4000 Kelvin and 5500 Kelvin. The color temperature of the functional general lighting device does not feel unpleasant, even though it is cool, because the functional general lighting device is located in proximity to the skylight (which is emitting an even cooler color, the blue and/or cyan light of a blue sky). Said artificial skylight may comprise, for example, a LED panel mimicking the colours of a blue sky along the black body line, i.e. a tuneable blue sky panel. Such a LED panel typically comprises cool white LEDs and LEDs on the border of cyan to blue, i.e. cyan-blue LEDs.

Said artificial skylight may comprise a light emitting surface and a light emitting inner rim surrounding said light emitting surface, said light emitting inner rim being perpendicular to said light emitting surface. Said inner rim may comprise a hard shadow mask or said controller may be configured to control said artificial skylight to render a shadow effect along at least part of said inner rim.

In a second aspect of the invention, a method of controlling a lighting arrangement, wherein said lighting arrangement comprises an artificial skylight and a functional general lighting device for providing horizontal light, said functional general lighting device comprising a horizontal luminous surface, said functional general lighting device being positioned in parallel and adjacent to said artificial skylight, and a (visible) spacing between said functional general lighting device and said artificial skylight not exceeding the width of said artificial skylight, comprises controlling said artificial skylight and said functional general lighting device to render different light effects of a dynamic light scene, said dynamic light scene specifying a temporal sequence of light effects for each of a plurality of lighting devices, said plurality of lighting devices including said artificial skylight and said functional general lighting device. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations for controlling a lighting arrangement, wherein said lighting arrangement comprises an artificial skylight and a functional general lighting device for providing horizontal light, said functional general lighting device comprising a horizontal luminous surface, said functional general lighting device being positioned in parallel and adjacent to said artificial skylight, and a spacing between said functional general lighting device and said artificial skylight not exceeding the width of said artificial skylight.

The executable operations comprise controlling said artificial skylight and said functional general lighting device to render different light effects of a dynamic light scene, said dynamic light scene specifying a temporal sequence of light effects for each of a plurality of lighting devices, said plurality of lighting devices including said artificial skylight and said functional general lighting device. Said method may be performed by software running on a programmable device. This software may be provided as a computer program product.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical (e.g. a visible light communication signal), or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
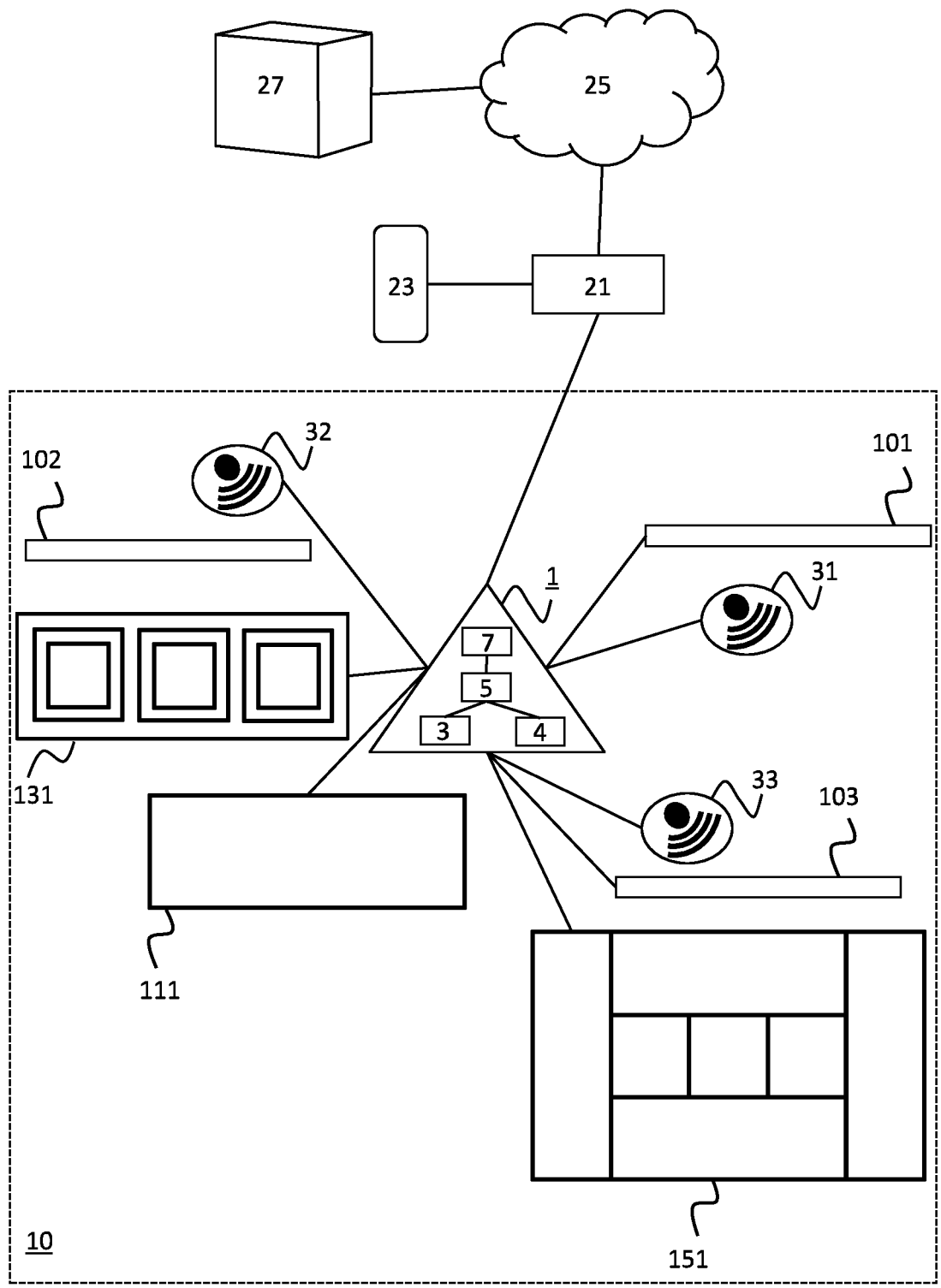
FIG. 1 is a block diagram of an embodiment of the system.

FIG. 1 shows an embodiment of the system: a controller 1, e.g. a gateway or a bridge, of a NatureConnect lighting system 10. The controller 1 comprises a receiver 3, a transmitter 4, a processor 5, and memory 7. NatureConnect is a system that delivers a compelling light experience by creating spaces that connect users with the constant cycles and variation of nature. NatureConnect changes the way how light is created in professional environments, as traditionally, the light generation in these spaces is functional and static.

With NatureConnect, a move is made away from functional illumination to natural light for inspiring environments and enhanced well-being and from static to dynamic and 3-dimensional for an immersive light experience. In this immersive light experience, a plurality of lighting devices, typically multiple kinds of lighting devices, including pixelated lighting devices, work together in one lighting system to provide a wide range of dynamic light scenes, with lighting arrangements 131 and 151 providing a realistic view to the sky, lighting arrangements 111 and 151 providing functional light, and peripheral lighting devices 101-103 providing natural feeling patterns, dynamics and tonalities of vertical illumination. Lighting arrangement 131 is an artificial skylight. Lighting arrangement 151 comprises an artificial skylight and light elements for providing functional light. In the embodiment of FIG. 1, lighting arrangement 111 is a canopy lighting device. The lighting devices are typically pixelated lighting devices.

A NatureConnect system is typically able to display dynamic and natural feeling content at (locally) different rates, scales and resolution. This offers an opportunity to more easily add a semantic meaning to the content played in using specific colors, dynamics and patterns. An example of natural feeling content is a dapple light effect, representing the shadow play of the sun's light rays falling through a canopy of (moving) tree leaves. Other examples of natural feeling content are the patterns and color gradients at the walls mimicking the natural sky gradient, as well as the set of colors of the sky and sun in the artificial skylight, albeit displayed at different levels of brightness, pixelation and resolution (when compared to, for example, dapple).

In a NatureConnect system, multiple light effects (comprising the different rhythms and cycles of nature) are rendered simultaneously by each of a plurality of lighting devices, wherein the multiple light effects are typically determined based on a (at least partially) predetermined dynamic lighting program which is mapped to a time period by means of a processor, e.g. processor 5, such that the dynamic lighting scene changes as time progresses. As such, the lighting system operates in a natural feeling manner and can operate without the need for user interaction. Alternatively or additionally, a NatureConnect system may be able to render pre-stored dynamic light scenes. In the embodiment of FIG. 1, the rendering of the light effects is coordinated centrally, by controller 1.

Figure 2:
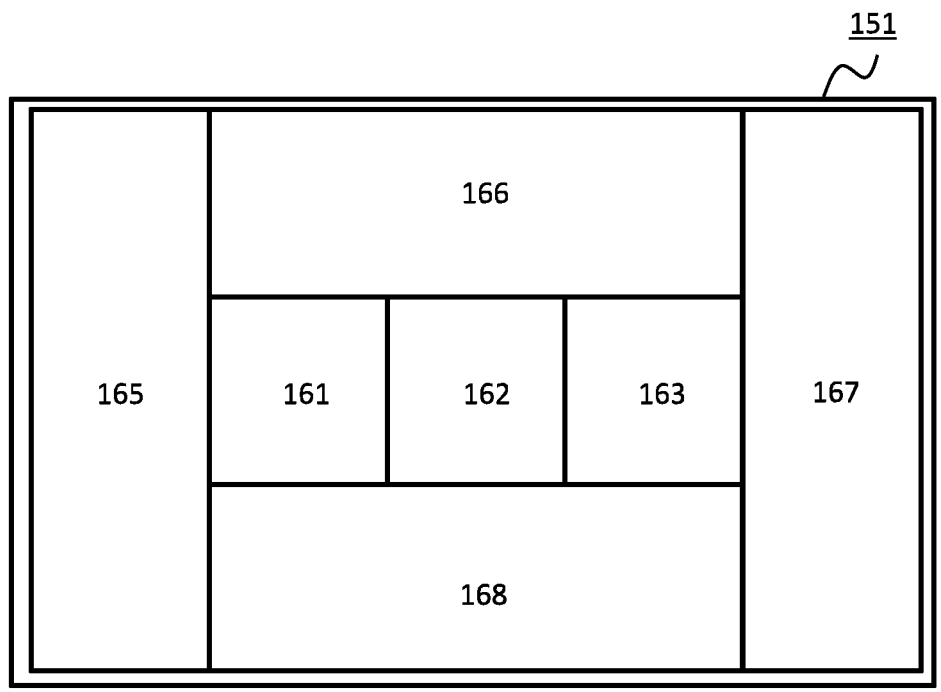
FIG. 2 is a block diagram of a first one of the lighting arrangements of FIG. 1.

Lighting arrangement 151 is shown in more detail in FIG. 2. Lighting arrangement 151 comprises three artificial skylights 161-163 and four functional general lighting devices 165-168 for providing horizontal light. Each of the functional general lighting devices 165-168 comprises a horizontal luminous surface. The functional general lighting devices 166 and 168 are positioned in parallel and adjacent to the artificial skylights 161-163, each on a different side of the artificial skylights 161-163. A spacing between the functional general lighting devices 166 and 168 and the artificial skylights 161-163 does not exceed the width of the artificial skylights 161-163. The artificial skylights 161-163 and the functional general lighting devices 166-168 have a width and a length in the horizontal direction and a height or depth in the vertical direction. The width is smaller than the length.

Optionally, the parallel arrangement of artificial skylights 161-163 and functional general lighting devices 166 and 168 is "capped" at least at one end by means of a second large luminous surface. In the embodiment of FIG. 2, the functional general lighting device 165 is a first edge functional general lighting device adjacent to a first end of the artificial skylight 161 in the length direction and the functional general lighting device 167 is a second edge functional general lighting device adjacent to a second end of the artificial skylight 163 in the length direction.

In the embodiment of FIG. 2, the width of the functional general lighting devices 166 and 168 is at least half of the width of the artificial skylights 161-163 and the spacing between the functional general lighting devices 166 and 168 and the artificial skylights 161-163 does not exceed five centimeters.

Figure 3:
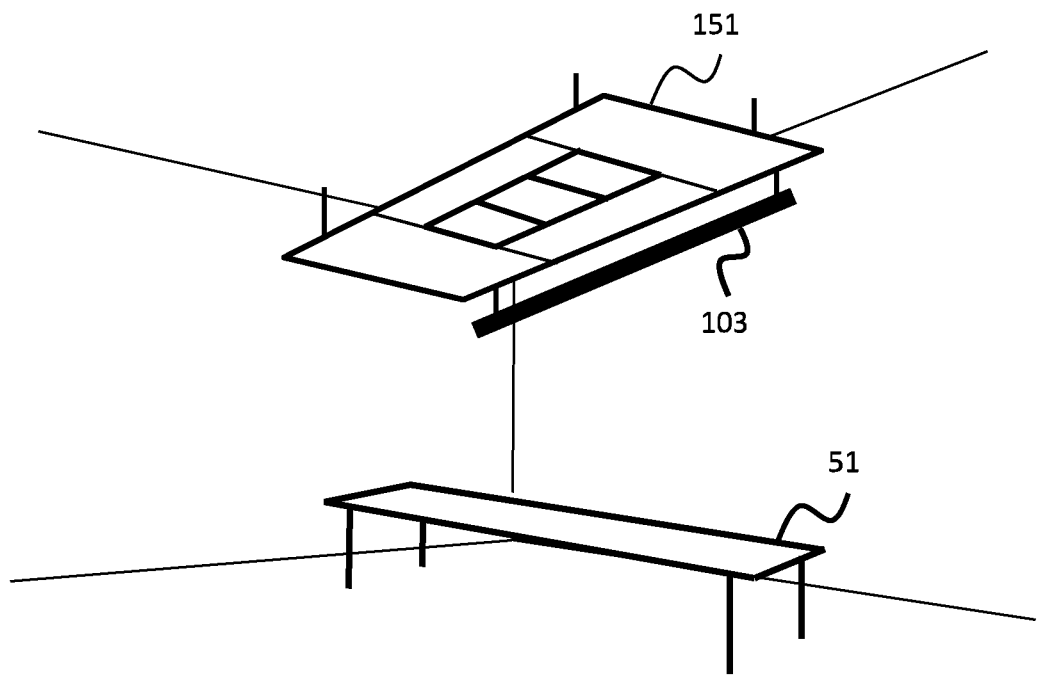
FIG. 3 shows a perspective view of room in which the lighting arrangement of FIG. 2 has been mounted.

FIG. 3 shows a perspective view of room in which the lighting arrangement 151 of FIG. 2 has been mounted. In the example of FIG. 3, the lighting arrangement 151 is suspended from a ceiling. In this way, the lighting arrangement looks like a "stand-alone" island. Although an installer is able to distribute the different lighting devices of a system like NatureConnect as he or she pleases along an existing suspended ceiling grid, the experience of an in grid installation is not as powerful as that of a cluster of lighting devices coming in the form of an "island", for example suspended from an open or closed ceiling. This because a grid "puts" an additional raster feel towards the installation.

The lighting arrangement 151 has an island finishing peripheral rim, which is preferably black. By using a height of the artificial skylight that is larger than the height of the island finishing peripheral rim, the level of illusion of the artificial skylight and structural feel of the ceiling may be increased. The peripheral lighting device 103 suspended from the lighting arrangement 151 and arranged in proximity to at least one of the office walls and illuminates at least one office wall. In an alternative embodiment, the peripheral lighting device 103 is attached to the lighting arrangement 151. The functional general lighting devices 165-168 illuminate a table 51 in the room.

Figure 4:
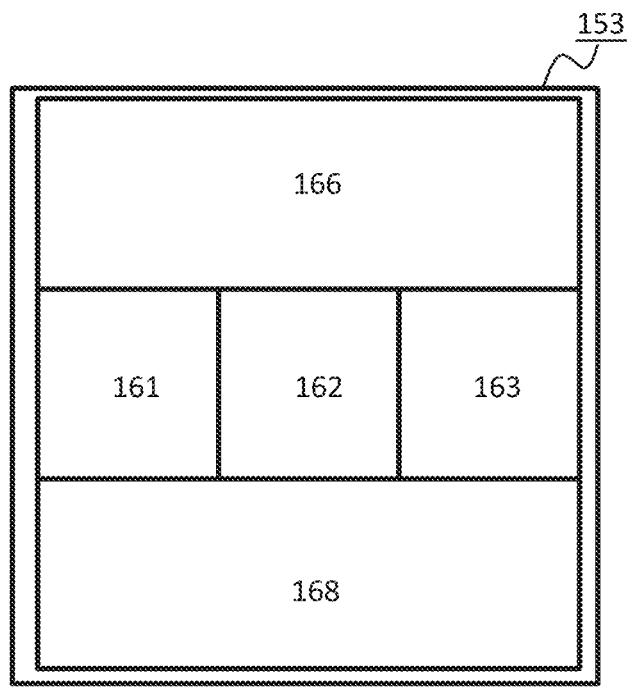
FIG. 4 is a block diagram of a first alternative embodiment of the lighting arrangement of FIG. 2.
Figure 5:
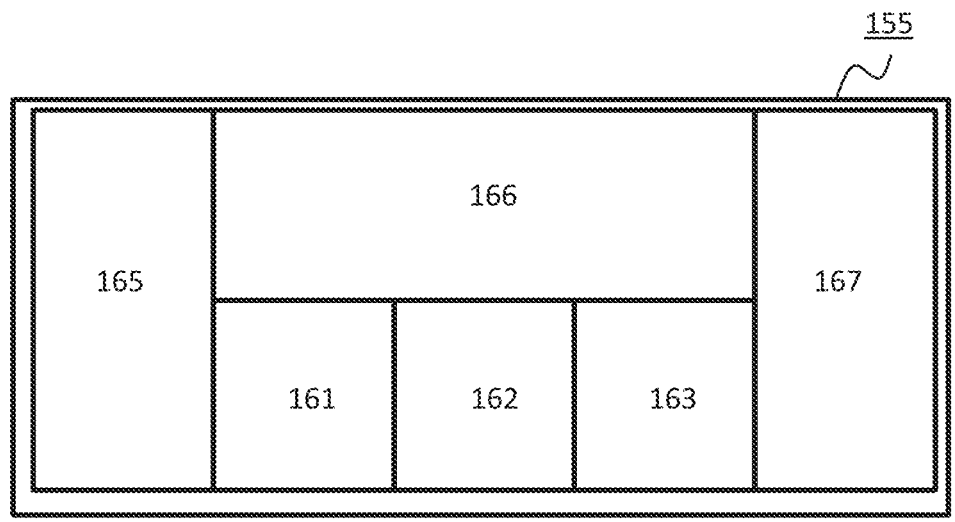
FIG. 5 is a block diagram of a second alternative embodiment of the lighting arrangement of FIG. 2.

In the alternative embodiment shown in FIG. 4, a lighting arrangement 153 is similar to the lighting arrangement 151 of FIG. 2, but without edge functional general lighting devices 165 and 167. In the alternative embodiment shown in FIG. 5, a lighting arrangement 155 is similar to the lighting arrangement 151 of FIG. 2, but without functional general lighting device 168.

The controller 1 performs at least one of a plurality of functions. If the controller is able to perform a first function, the processor 5 is configured to control the artificial skylights 161-163, the functional general lighting devices 165-168, and the peripheral lighting device 103 to render different light effects of a dynamic light scene. The dynamic light scene specifies a temporal sequence of light effects for each of a plurality of lighting devices. The plurality of lighting devices includes the artificial skylights 161-163, the functional general lighting devices 165-168, and the peripheral lighting device 103.

In the embodiment of FIG. 1, the processor 5 is also configured to control the peripheral lighting device 101-102, the artificial skylight 131, and the functional general lighting device 111, either to render different light effects of the same dynamic light scene or to render different light effects of a different dynamic light scene.

In the embodiment of FIG. 1, the processor 5 is configured to control the functional general lighting devices 165-168 at a light level that is harmonized to a light level at which the artificial skylights 161-163 are controlled. In the embodiment of FIG. 1, the processor 5 is configured to control the artificial skylights 161-163 to render blue and/or cyan light and the functional general lighting devices 165-168 to render light with a color temperature between 4000 Kelvin and 5500 Kelvin.

Figure 6:
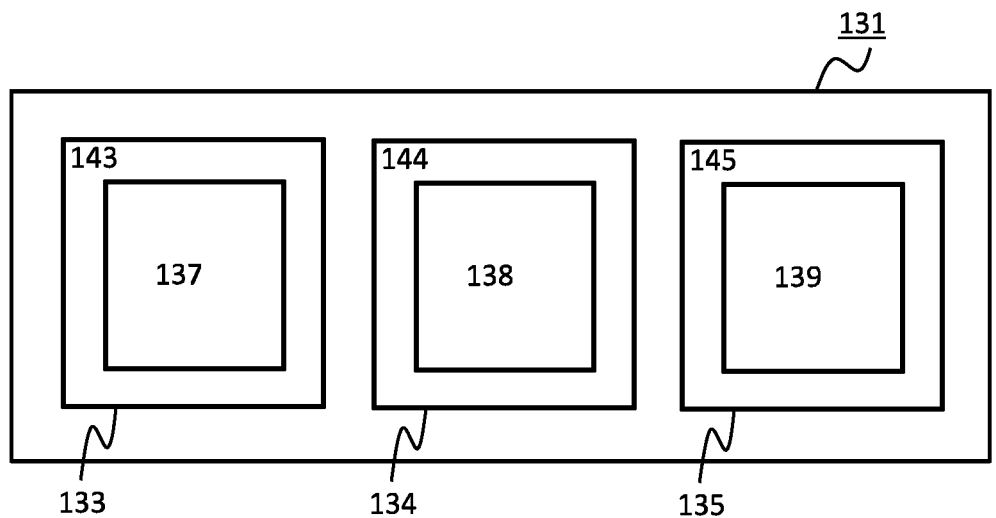
FIG. 6 is a block diagram of a second one of the lighting arrangements of FIG. 1.

The artificial skylights 161-163 of FIGS. 2 to 5 each comprise a light emitting surface and may further comprise a light emitting inner rim surrounding the light emitting surface, which is perpendicular to the light emitting surface. An example of such a light emitting rim is shown in FIG. 6. In this case, the dynamic light sequence may specify the light effects for the light emitting surface and the light emitting inner rim of an artificial skylight separately. The processor 5 may be configured to control the light emitting inner rims of the artificial skylights to render a shadow effect along at least part of the inner rim. Alternatively, a backlit inner rim may comprise a (static) hard shadow mask at the front of the backlit inner rim to yield a shadow effect.

Lighting arrangement 131 is shown in more detail in FIG. 6. Lighting arrangement 131 does not comprise any functional general lighting device, but only artificial skylights 133-135. Each of the artificial skylights 133-135 comprises a light emitting surface and a light emitting inner rim surrounding the light emitting surface. The light emitting inner rim is perpendicular to the light emitting surface. The light emitting inner rim may be used to emulate sun struck portions of a rim of a real skylight.

Figure 7:
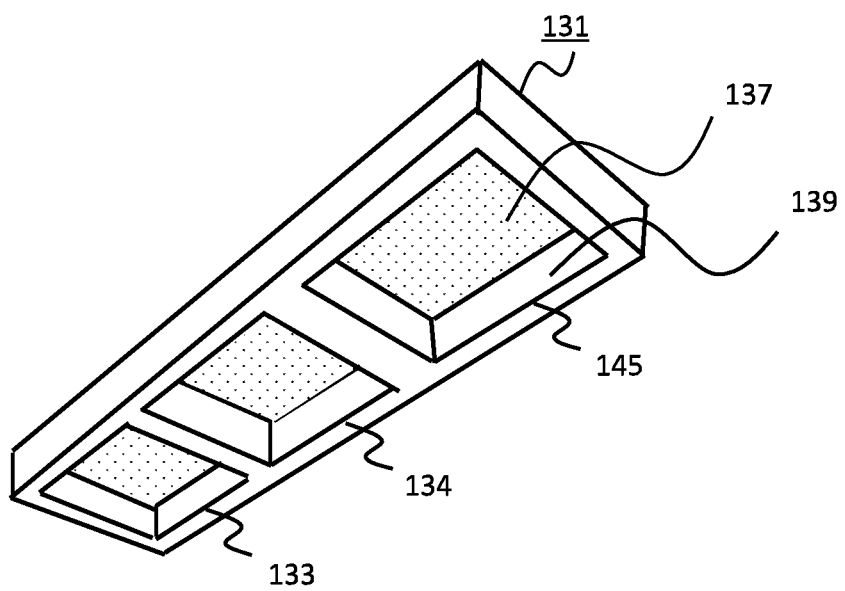
FIG. 7 shows a perspective bottom view of the lighting arrangement of FIG. 6.

Artificial skylight 133 comprises a light emitting surface 137 and light emitting inner rim 143. Artificial skylight 134 comprises a light emitting surface 138 and light emitting inner rim 144. Artificial skylight 135 comprises a light emitting surface 139 and light emitting inner rim 145. FIG. 7 shows a perspective bottom view of the lighting arrangement 131 of FIG. 6.

If the controller 1 is able to perform a second function, the processor 5 is configured to determine a dynamic light scene and control, via the transmitter 4, the light emitting surfaces 137-139 (also referred to as skylight panels), the light emitting inner rims 143-145 (also referred to as frames), the functional general lighting device 111 (also referred to as canopy lighting device), and the peripheral lighting device 102 to render the dynamic light scene. The dynamic light scene specifies a temporal sequence of light effects for each of a plurality of lighting devices. The plurality of lighting devices comprises the light emitting surfaces 137-139, the light emitting inner rims 143-145 and the functional general lighting device 111. The functional general lighting device 111 comprises a horizontal luminous surface.

A light intensity level of the light effect for the light emitting surfaces 137-139 at a first moment in the dynamic light scene is higher than a light intensity level of the light effect for the light emitting surface 137-139 at a second moment in the dynamic light scene, a light intensity level of the light effect for the light emitting inner rims 143-145 at the first moment is higher than a light intensity level of the light effect for the light emitting inner rims 143-145 at the second moment, a light intensity level of the light effect for the functional general lighting device 111 at the first moment is higher than a light intensity level of the light effect for the functional general lighting device 111 at the second moment.

A color temperature of the light effect for the light emitting surfaces 137-139 at the first moment is higher than a color temperature of the light effect for the light emitting surfaces 137-139 at the second moment, a color temperature of the light effect for the light emitting inner rims 143-145 at the first moment is higher than a color temperature of the light effect for the light emitting inner rims 143-145 at the second moment, a color temperature of the light effect for the functional general lighting device 111 at the first moment is higher than a color temperature of the light effect for the functional general lighting device 111 at the second moment.

In an experiment, on switching on the artificial skylight, although hardly providing any functional light, the space opened up and felt spacious when setting the color temperatures and light intensity levels as described above. Furthermore, by matching the color temperature of the sun struck portion of the inner rim (frame) with the color temperature of functional general lighting device (canopy), the spaciousness was further increased, and a more natural feel was provided. Moreover, when the color of the artificial sky in the skylight was set to deeper blue (>11000 K), the color temperature of the functional light could be increased well beyond 4000 K without feeling uncomfortable.

The first moment may correspond to solar noon and the second moment may correspond to sunrise, a moment between sunrise and at most an hour after sunrise, sunset, or a moment between at most an hour before sunset and sunset, for example. The hour after sunrise and the hour before sunset are also referred to as golden hours.

In the embodiment of FIG. 1, the processor 5 of the controller 1 is configured to ensure that a difference between the color temperature of the light effect for the functional general lighting device 111 and the color temperature of the light effect for the light emitting inner rims 143-145 stays below 1500 Kelvin at the first moment, at the second moment, and at any moment between the first moment and the second moment.

In the embodiment of FIG. 1, the processor 5 of the controller 1 is configured to ensure that the color temperature for the light emitting surfaces 137-139 stays above 5000 Kelvin at the first moment, at the second moment, and at any moment between the first moment and the second moment.

In the embodiment of FIG. 1, the processor 5 of the controller 1 is configured to ensure that the color temperature of the light effect for the light emitting surfaces 137-139 at the first moment is higher than or equal to the color temperature of the light effect for the functional general lighting device 111 at the first moment, and the color temperature of the light effect for the light emitting surfaces 137-139 at the first moment is higher than or equal to the color temperature of the light effect for the light emitting inner rims 143-145 at the first moment.

In the embodiment of FIG. 1, the processor 5 of the controller 1 is configured to ensure that the light intensity level of the light effect for the light emitting surfaces 137-139 at the first moment is higher than the light intensity level of the light effect for the light emitting inner rims 143-145 at the first moment, and the light intensity level of the light effect for the light emitting surfaces 137-139 at the first moment is higher than the light intensity level of the light effect for the functional general lighting device 111 at the first moment.

Figure 8:
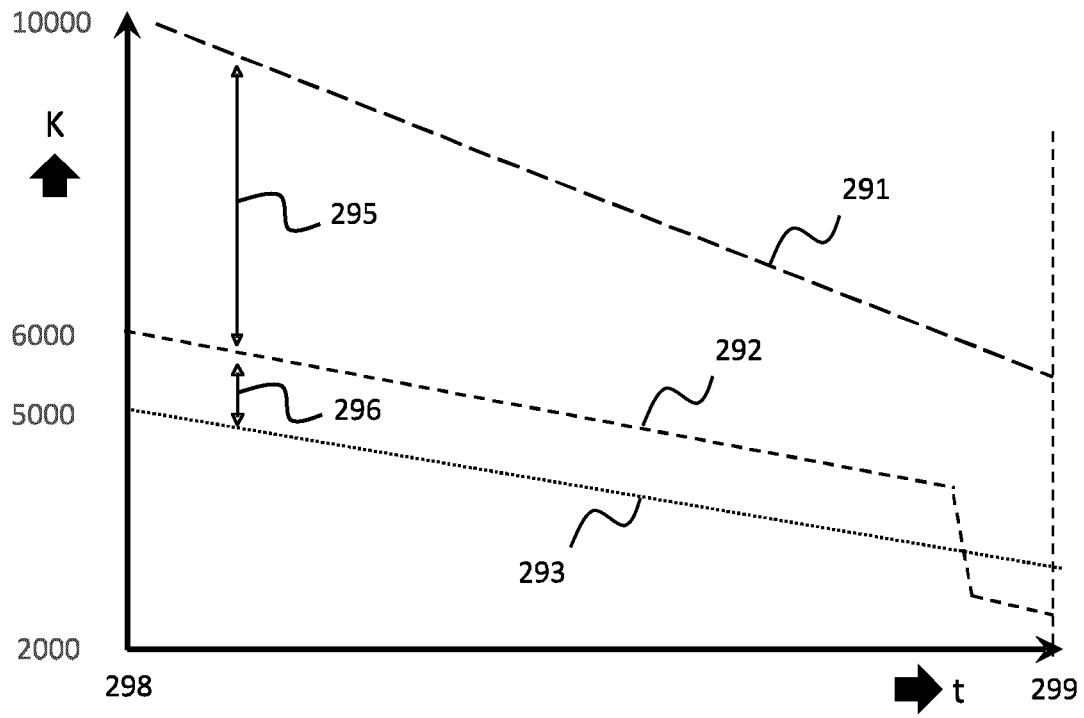
FIG. 8 shows an example of color temperature changes from a first moment to a second moment of different lighting devices participating in a dynamic light scene.

FIG. 8 shows an example of color temperature changes from a first moment 298, e.g. solar noon, to a second moment 299, e.g. sunset, of different lighting devices participating in a dynamic light scene. The dynamic light scene represented in FIG. 8 corresponds to a normal sunny day. In FIG. 8, color temperatures 291 are rendered by the light emitting surface(s) of the artificial skylight(s), color temperatures 292 are rendered by the functional general lighting device(s), and color temperatures 293 are rendered by the light emitting inner rim(s) of the artificial skylight(s).

In the example of FIG. 8, the color temperature 291 of the light effect for the light emitting surface(s) at the first moment 298 is higher than the color temperature 292 of the light effect for the functional general lighting device(s) at the first moment 298, and the color temperature 292 of the light effect for the functional general lighting device(s) at the first moment 298 is higher than the color temperature 293 of the light effect for the light emitting inner rim(s) at the first moment 298.

In the example of FIG. 8, a first difference 296 between the color temperature 292 of the light effect for the functional general lighting device and the color temperature 293 of the light effect for the light emitting inner rim exceeds 500 Kelvin and a second difference 295 between the color temperature 291 of the light effect for the light emitting surface and the color temperature 292 of the light effect for the functional general lighting device exceeds the first difference 296 multiplied by two.

In the example of FIG. 8, the color temperature 291 of the light effect for the light emitting surface(s) at the second moment 299 is higher than the color temperature 293 of the light effect for the light emitting inner rim(s) at the second moment 299, and the color temperature 293 of the light effect for the light emitting inner rim(s) at the second moment 299 is higher than the color temperature 292 of the light effect for the functional general lighting device(s) at the second moment 299.

In the example of FIG. 8, the color temperatures 291 of the light effects for the light emitting surface do not increase between the first moment 298 and the second moment 299 and the color temperatures 292 of the light effects for the functional general lighting device do not increase between the first moment 298 and the second moment 299.

Corresponding light intensity levels are not shown in FIG. 8, but the light intensity level of the light effect for the light emitting surface(s) at the first moment 298 is preferably higher than the light intensity level of the light effect for the light emitting inner rim(s) at the first moment 298, and the light intensity level of the light effect for the light emitting inner rim(s) at the first moment 298 is preferably higher than the light intensity level of the light effect for the functional general lighting device(s) at the first moment 298.

Preferably, the light intensity level of the light effect for the light emitting surface(s) at the second moment is higher than the light intensity level of the light effect for the light emitting inner rim(s) at the second moment, and a difference between the light intensity level of the light effect for the light emitting inner rim(s) at the second moment and the light intensity level of the light effect for the functional general lighting device(s) at the second moment is below a predetermined threshold.

In other words, if the light emitting surface is represented by 1, the lighting emitting inner rim is represented by 2, and the functional general lighting device is represented by 3, the following conditions are preferably complied with at the first moment to increase the sensation of spaciousness:

CT1>CT3>CT2

ΔCT23=CT3−CT2>500 K

ΔCT13=CT1−CT3>2×ΔCT23

Preferably, the following condition is complied with at the second moment to increase the sensation of spaciousness: CT1>CT2>CT3. Preferably, at the first moment L1>L2>L3 and at the second moment L1>L3~L2.

Alternatively, on an average sunny day, the following conditions may be complied with:

First moment: CT1>7000 K

First moment: CT3<5000 K

Second moment: CT2<2500 K

Second moment: CT3>CT2+500 K

Alternatively, on a cloudy or foggy day, the following conditions may be complied with: first moment: CT1~CT2~CT3 with L1>L3>L2 (supplemental lighting is typically needed to yield a minimum light level at a user's desk).

Alternatively, on an extremely sunny day, the following conditions may be complied with: first moment: CT1>20.000 K, CT3 <5500 K and CT2>5500 K If the controller 1 is able to perform a third function, the processor 5 is configured to receive, via the receiver 3, light sensor data from light sensor 31 and determine a visibility threshold based on the light sensor data. The light sensor data is indicative of an ambient light level. The processor 5 is further configured to determine the plurality of light effects to be rendered by the peripheral lighting device 101 and determine whether light intensity levels of the plurality of light effects exceed the visibility threshold. The light intensity levels comprise at least one light intensity level of the at least one light effect The processor 5 is configured to increase the at least one light intensity level above the visibility threshold, to harmonize the at least one light intensity level with the ambient light level, upon determining that the at least one light intensity level does not exceed the visibility threshold, and control, via the transmitter 4, the peripheral lighting device 101 to render the plurality of light effects. The peripheral lighting device 101 is controlled to render the at least one light effect with the increased at least one light intensity level.

The processor 5 is configured to do the same with light sensor 32 and peripheral lighting device 102 and with light sensor 33 and peripheral lighting device 103. Additionally, light intensity levels of other lighting devices than the peripheral lighting devices may be adjusted based on light sensor data received from one of light sensors 31-33. In the embodiment of FIG. 1, the plurality of light effects is specified in a dynamic light scene.

One or more of the light sensors 31-33 may be a multi-spectral light sensor. In this case, the light sensor data received from this light sensor is spectral light sensor data and the processor 5 is configured to determine wavelengths of the plurality of light effects and determine whether the light intensity levels of the plurality of dynamic light effects exceed the visibility threshold based on the wavelengths. In this case, the light sensor data is further indicative of an ambient color and the processor 5 may then be configured to adjust a color value of the at least one light effect to harmonize the color value with the ambient color.

If the controller 1 is able to perform a fourth function, the processor 5 is configured to determine, from a dynamic light scene, a plurality of light effects to be rendered by one or more of a plurality of lighting devices, control, via the transmitter 4, the one or more lighting devices to render the plurality of light effects. The plurality of light effects corresponds to a first moment in the dynamic light scene. The dynamic light scene specifies a temporal sequence of light effects for each of the plurality of lighting devices. The plurality of lighting devices comprises lighting devices 101-103,111,131, and 151 or a subset thereof.

The processor 5 is further configured to receive a user input signal via the receiver 3, determine a second moment in the dynamic light scene based on the user input signal, determine a transition from the first moment to the second moment, determine, from the dynamic light scene, a plurality of further light effects to be rendered by the one or more lighting devices, and control, via the transmitter 4, the one or more lighting devices to render the plurality of further light effects after the transition. The plurality of further light effects corresponds to the second moment in the dynamic light scene.

The transition is faster than a normal transition from the first moment to the second moment, as specified in the dynamic light scene. The transition may be immediate for at least a first subset of the one or more lighting devices and/or gradual for at least a second subset of the one or more lighting devices. The user input signal is indicative of a time difference between the first moment and the second moment and/or indicative of a desire to go forward in time in the dynamic light scene or indicative of a desire to go backward in time in the dynamic light scene.

As a first example, the dynamic light scene represents a daylight scene and the first moment and the second moment correspond to different times of a day. As a second example, the dynamic light scene represents a firelight scene and the first moment and the second moment correspond to different scales of a fire. As a third example, the dynamic light scene represents a forest scene and the first moment and the second moment correspond to different tree and/or leaf densities.

In the example of FIG. 1, the user input signal is received from a mobile device 23. Both the controller 1 and the mobile device 23 are connected to a wireless LAN access point 21, e.g. via Wi-Fi. The mobile device 23 may run an app for controlling the lighting devices of the lighting system 10 or a subset thereof, for example. The wireless LAN access point 21 is also connected to Internet 25. An Internet server 27 is also connected to the Internet. The Internet server 27 may store dynamic light scenes, for example.

In an alternative embodiment, the user input signal is received via a control device that comprises a one-dimensional control element, e.g. a (continuous) rotatable control element. The control device may be comprised in the controller 1 or may be external to the controller 1. The control device may comprise a display and may be configured to display a representation of the first moment and/or the second moment in the dynamic light scene on the display.

It is beneficial to display dynamic visual feedforward and feedback on the control display or on another screen within the room (e.g. smart phone, smart TV or video projector) that can render the current scene in high fidelity, e.g. passing clouds, moving tree canopy, or reflections on water, along with the current value of the dominant parameter controlled by the one-dimensional control element. This dynamic visualization of what is currently playing (e.g. slowly passing clouds) may be adapted dynamically in real-time when the one-dimensional control element is used to change the dominant parameter (e.g. change in cloudiness as clouds continue to pass by at a given time of the day), giving further feedforward/feedback to the user in addition to changes in the lighting system.

It is effective, intuitive and useful to allow humans to control only, and only one light scene parameter for the current scene, preferably the most dominant parameter indicative for the light scene (to be) selected. For a prestored dynamic light scene, allowing a user to change individual settings of the dynamic light scene is less beneficial. However, even if the dynamic light scene is created in real-time by dynamic lighting program and it might be possible to allow a user to change higher-level parameters of the program, it is very intuitive to allow the user to be able to change the moment in a dynamic light scene, e.g. in a dynamic light scene that mimics the light conditions outside or in a firelight scene. The moment in the dynamic light scene may correspond to a time of day, for example, but this is not required.

If the dynamic light scene is created in real-time by dynamic lighting program, there may be further (higher-level) parameters that a user is allowed to change, e.g. the weather condition in a daylight mimicking light scene or a light scene scape. In the embodiment of FIG. 1, the processor 5 is configured to determine one or more values of one or more such further parameters based on the user input signal, adapt at least one of the plurality of further light effects to be rendered by the one or more lighting devices based on the one or more values and control the one or more lighting devices to render the adapted at least one further light effect after the transition.

If a dynamic lighting program renders a fire scene with outdoor mimicking light conditions as backdrop, the user may be able to change the time of day by changing the moment in the dynamic light scene, but may additionally be able to change one or more higher-level parameters relating to the fire. These one or more higher-level parameters may be nested parameters, i.e. a value of a higher-level parameter may correspond to values of multiple different lower-level parameters. Changes these further parameters may also be immediate or gradual.

For example, the user may be able to change the amount of wood on the fire and the transition may be gradual. This is beneficial, because when a calm bonfire is fed by adding more wood to a real fire, it also takes some time before the colors of the fire get richer, the level of motion intensifies, the height of the flames rises as well as the flame density and frequency of change. Thus, a single action of adding wood induces changes in the lower-level parameters (amount and rate of flame-able ingredients escaping at velocity v and burning at height x, at color pointy, in and ambient of temperature T and a wind velocity w, etc. etc.), and may affect the rendering on multiple lighting devices.

In the embodiment of the controller 1 shown in FIG. 1, the controller 1 comprises one processor 5. In an alternative embodiment, the controller 1 comprises multiple processors. The processor 5 of the controller 1 may be a general-purpose processor, e.g. ARM-based, or an application-specific processor. The processor 5 of the controller 1 may run a Unix-based operating system for example. The memory 7 may comprise one or more memory units. The memory 7 may comprise one or more hard disks and/or solid-state memory, for example.

The receiver 3 and the transmitter 4 may use one or more wired or wireless communication technologies such as Zigbee or Bluetooth to communicate with the sensor devices 31-33 and the lighting devices 101-103, 111, 131 and 151 and Ethernet or Wi-Fi to communicate with the wireless LAN access point 21, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The lighting devices 101-103, 111, 131, 151 each comprise a plurality of LEDs. The LEDs may be direct emitting or phosphor converted LEDs.

The controller 1 may comprise other components typical for a controller such as a power connector. The invention may be implemented using a computer program running on one or more processors. In the embodiment of FIG. 1, the system of the invention is a controller. In an alternative embodiment, the system of the invention is a different device, e.g. a lighting device. In the embodiment of FIG. 1, the system of the invention comprises a single device. In an alternative embodiment, the system of the invention comprises a plurality of devices.

Figure 9:
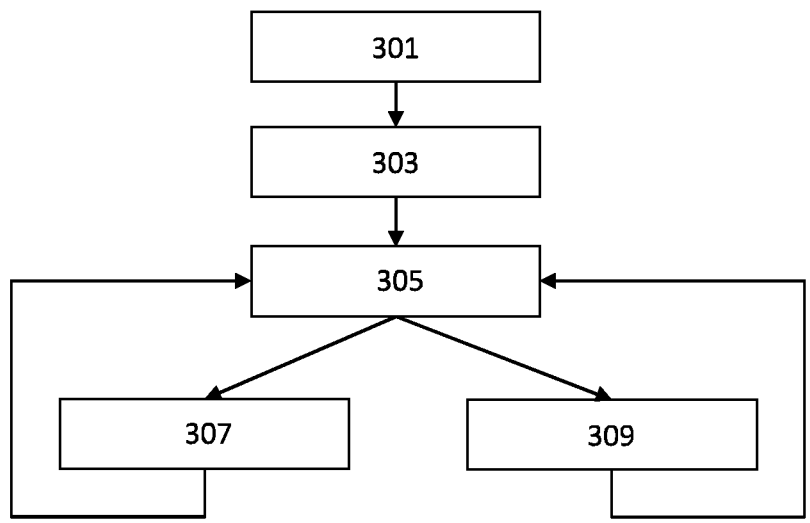
FIG. 9 is a flow diagram of an embodiment of the method of controlling a lighting arrangement comprising an artificial skylight and a functional general lighting device.

An embodiment of the method of controlling a lighting arrangement comprising an artificial skylight and a functional general lighting device for providing horizontal light is shown in FIG. 9. The functional general lighting device comprises a horizontal luminous surface. The functional general lighting device is positioned in parallel and adjacent to the artificial skylight. A spacing between the functional general lighting device and the artificial skylight does not exceed the width of the artificial skylight.

A step 301 comprises determining a dynamic light scene. The dynamic light scene specifies a temporal sequence of light effects for each of a plurality of lighting devices, including the artificial skylight and the functional general lighting device. In step 301, the dynamic light scene may be partly or entirely obtained from a memory and/or or may be partly or entirely created, e.g. by a dynamic lighting program. Parameters for the dynamic light scene may specify that the artificial skylight should render blue and/or cyan light and the functional general lighting device should render light with a color temperature between 4000 Kelvin and 5500 Kelvin, for example.

A step 303 comprising determining light effects corresponding to a current moment in the sequences of light effects. A different light effect is determined for each of the plurality of lighting devices. Each light effect comprises a light intensity level and a color. If the lighting device only renders white light, the color may be expressed as color temperature, for example.

In the embodiment of FIG. 9 a step 305 is performed after step 303. Step 305 comprises harmonizing the light level for the functional general lighting device to the light level specified for the artificial skylight. Steps 307 and 309 comprise controlling the artificial skylight and the functional general lighting device, respectively, to render the different light effects determined in step 305. Step 305 is repeated after steps 307 and 309 have been performed, after which the method proceeds as shown in FIG. 9.

In a variant on the embodiment of FIG. 9, the artificial skylight comprises a light emitting surface and a light emitting inner rim surrounding the light emitting surface. The light emitting inner rim is perpendicular to the light emitting surface. In this variant, step 307 comprises controlling the artificial skylight to render a shadow effect along at least part of the inner rim.

Alternatively, the light emitting inner rim may comprise a (static) hard mask for creating a static shadow, e.g. at the front or at the back side of a backlit light diffuser. In the latter case, the hard mask is located between the backlight and the light diffuser, preferably arranged in close proximity (typically the closer the better) to the backside of the light diffuser, but not optically touching. The mask may be an integral part of the frame onto which the light diffuser is attached (typically by clamping), a separate part attached to the frame, or a "spring" load part pushed against the back side of the light diffuser, for example.

Alternatively, the shape of the light-engine and/or the mixing box may be reshaped from rectangular to a shape having one slanted side to create a shadow effect. The light effects for the light emitting surface and the light emitting rim may specified separately in the dynamic light sequence.

Figure 10:
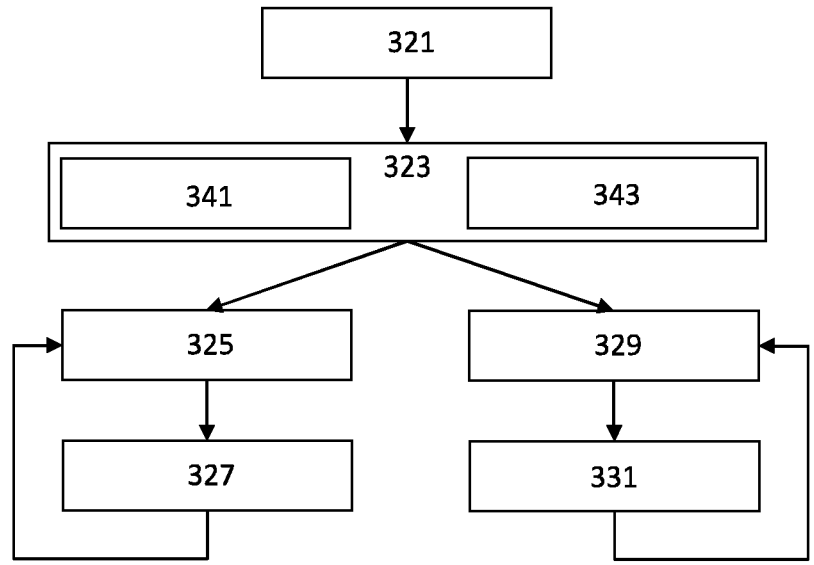
FIG. 10 is a flow diagram of an embodiment of the method of controlling an artificial skylight comprising a light emitting surface and a light emitting inner rim.

An embodiment of the method of controlling an artificial skylight to render light effects is shown in FIG. 10. The artificial skylight comprises a light emitting surface and a light emitting inner rim surrounding the light emitting surface. The light emitting inner rim is perpendicular to the light emitting surface.

A step 321 comprises determining a weather condition, e.g. normal sunny day, extremely sunny day, cloudy day, or foggy day. A step 323 comprises determining a dynamic light scene based on the weather condition determined in step 321. The dynamic light scene specifies a temporal sequence of light effects for each of a plurality of lighting devices. The plurality of lighting devices comprises the light emitting surface, the light emitting inner rim and a functional general lighting device for providing horizontal light. The functional general lighting device comprises a horizontal luminous surface. In an alternative embodiment, step 321 is omitted and the dynamic light scene is not determined based on a weather condition.

In the embodiment of FIG. 10, step 323 comprises sub steps 341 and 343. Step 341 comprises determining the light intensity levels of the light effects and step 343 comprises determining the color temperatures of the light effects. In the dynamic light scene, the light intensity level of the light effect for the light emitting surface at a first moment in the dynamic light scene is higher than the light intensity level of the light effect for the light emitting surface at a second moment in the dynamic light scene. The intensity level of the light effect for the light emitting inner rim at the first moment is higher than the light intensity level of the light effect for the light emitting inner rim at the second moment. The light intensity level of the light effect for the functional general lighting device at the first moment is higher than the light intensity level of the light effect for the functional general lighting device at the second moment.

Furthermore, in the dynamic light scene, the color temperature of the light effect for the light emitting surface at the first moment is higher than the color temperature of the light effect for the light emitting surface at the second moment. The color temperature of the light effect for the light emitting inner rim at the first moment is higher than the color temperature of the light effect for the light emitting inner rim at the second moment. The color temperature of the light effect for the functional general lighting device at the first moment is higher than the color temperature of the light effect for the functional general lighting device at the second moment.

Steps 325 and 329 are performed after step 323. Step 325 comprising determining a light effect for the artificial skylight which corresponds to a current moment in the corresponding sequence of light effects. Step 329 comprises determining a light effect for the functional general lighting device which corresponds to the current moment in the corresponding sequence of light effects. Steps 327 and 331 comprise controlling the artificial skylight and the functional general lighting device, respectively, to render the light effects determined from the dynamic light scene in steps 325 and 329, respectively. Step 325 and 329 are repeated after steps 307 and 309 have been performed, after which the method proceeds as shown in FIG. 10.

Figure 11:
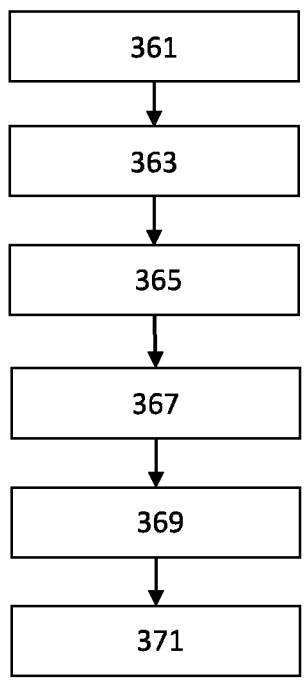
FIG. 11 is a flow diagram of a first embodiment of the method of adjusting at least one light effect based on an ambient light level.

A first embodiment of the method of adjusting at least one light effect of a plurality of light effects to be rendered by a lighting device based on an ambient light level is shown in FIG. 11. A step 361 comprises receiving light sensor data from a light sensor. The light sensor data is indicative of an ambient light level. Sampling of the ambient light level may be done (semi) continuous or intermittent with the electronic switching of the artificial light (for example at start-up/in between PWM cycles, or differential (as the system drive waveforms, thus, the spectral modulation of the overall light is known), for example.

A step 363 comprises determining a visibility threshold based on the light sensor data. A step 365 comprises determining the plurality of light effects to be rendered by the lighting device. A step 367 comprises determining whether light intensity levels of the plurality of light effects exceed the visibility threshold. The light intensity levels comprise at least one light intensity level of the at least one light effect.

A step 369 comprises increasing the at least one light intensity level above the visibility threshold, to harmonize the at least one light intensity level with the ambient light level, upon determining that the at least one light intensity level does not exceed the visibility threshold. A step 371 comprises controlling the lighting device to render the plurality of light effects. The lighting device is controlled to render the at least one light effect with the increased at least one light intensity level.

The method is typically used to control a plurality of lighting devices in a lighting system. Preferably, different pixelated lighting devices are controlled to work together as one system. The plurality of lighting device may comprise a realistic feeling, artificial skylight providing a view to the sky, an accent (peripheral) light providing biological and emotional (patterns, colors and rhythm) light, and a general lighting device providing functional light.

In this manner, a natural lighting system may be provided that has system behavior that improves upon the behavior of conventional and static lighting systems in that the natural lighting system automatically harmonizes its behavior towards the ambient light conditions within the (office) space relative to its own system capabilities, with the aim to sustain an immersive and natural feeling light experience under a wide variety of ambient light conditions, with the natural feeling being inspired upon the constant cycles and variations of nature, whilst simultaneously at least sustaining a minimum light level at the working surface and vertical surfaces of a space (i.e. walls) where applicable, consistent with a direct view at a natural feeling artificial skylight and vice versa.

Figure 12:
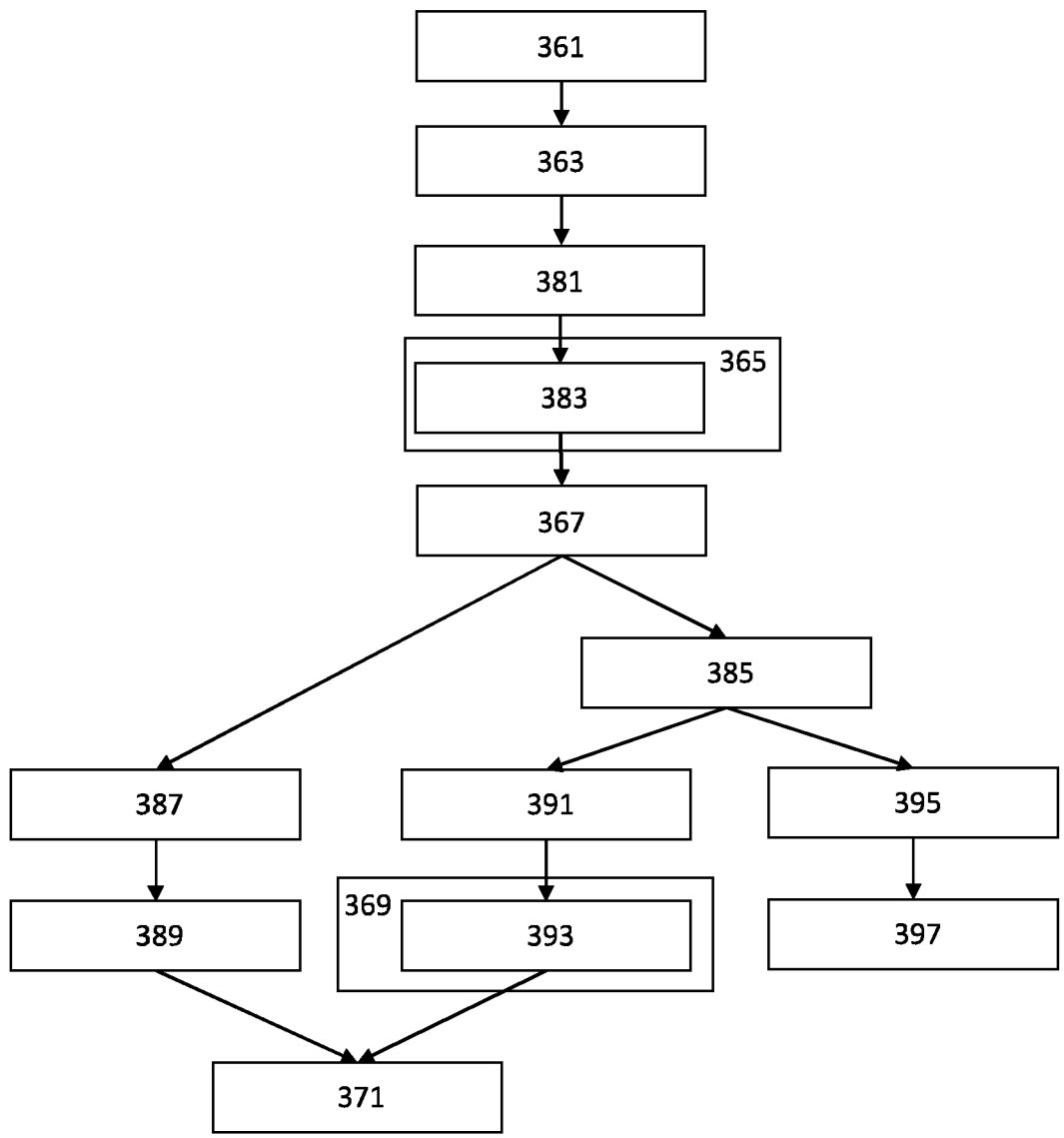
FIG. 12 is a flow diagram of a second embodiment of the method of adjusting at least one light effect based on an ambient light level.

A second embodiment of the method of adjusting at least one light effect of a plurality of light effects to be rendered by a lighting device based on an ambient light level is shown in FIG. 12. Step 361 comprises receiving light sensor data from a light sensor. The light sensor data is indicative of an ambient light level. Step 363 comprises determining a visibility threshold based on the light sensor data.

Next, a step 381 comprises determining a difference between a maximum light level which can be rendered by the lighting device and the ambient light level. Step 365 comprises determining the plurality of light effects to be rendered by the lighting device. In the embodiment of FIG. 12, step 365 is implemented by a step 383. Step 383 comprises determining the plurality of light effects to be rendered by the lighting device based on the difference determined in step 381. If the difference is large, a dynamic light sequence may be selected that is less like the conditions (e.g. time of day, season, weather conditions) outside. If the difference is not large, a dynamic light sequence may be selected that is more like the conditions outside.

In certain instances, it may be useful to choose the content/dynamic light scene such that at least part of the content rises above the visibility threshold or the content playing such that it feels as a natural extension of outdoors, indoor. At yet another time of the day, such as during the golden hour, the color of the ambient (incident day) light may shift towards the more reddish colors. This may be possible if the light sensor data is further indicative of an ambient color.

Step 367 comprises determining whether light intensity levels of the plurality of light effects exceed the visibility threshold. The light intensity levels comprise at least one light intensity level of the at least one light effect. Light effects with light intensity levels that exceed the visibility threshold are selected in step 387. A step 389 is performed after step 387. Step 389 comprises increasing these light intensity levels to harmonize them with the ambient light level.

For light effects with light intensity levels that do not exceed the visibility threshold, a step 385 is performed. Step 385 comprises determining whether one or more of these light intensity levels can be increased above the visibility threshold. Light effects with these intensity levels are selected in step 391. The remaining light effects, if any, are selected in step 395 and omitted from the light effect rendering in step 397.

Step 369 is performed after step 391. In the embodiment of FIG. 12, step 369 is implemented by a step 393. Step 393 comprises increasing the light intensity levels selected in step 391 above the visibility threshold, proportional to the ambient light level. Step 371 comprises controlling the lighting device to render the light effects selected in steps 387 and 391 with the light intensity levels as determined in steps 389 and 393.

Dynamic lighting systems such as NatureConnect systems preferably apply different strategies under different ambient light conditions, with the system strategy automatically chosen depending upon, for example, the local light conditions (artificial light and/or daylight), season, weather, space utilization, content already playing, and the use of blinds. As a result, the same system in the same space may be capable of overperforming the ambient light conditions for one particular time of the day, whereas on different ambient light conditions for another part of the same day, the same system may be underperforming.

The aim of the system is to provide an optimal, natural feeling and immersive light-experience at all times, but this is typically not achieved by (exactly) copying (the light levels and/or dynamics) of the outdoors. Instead, the dynamic lighting system harmonizes the constant cycles and variation of nature in a natural feeling manner across a space, e.g. office space, by increasing light intensity levels above the visibility threshold where desirable.

Figure 13:
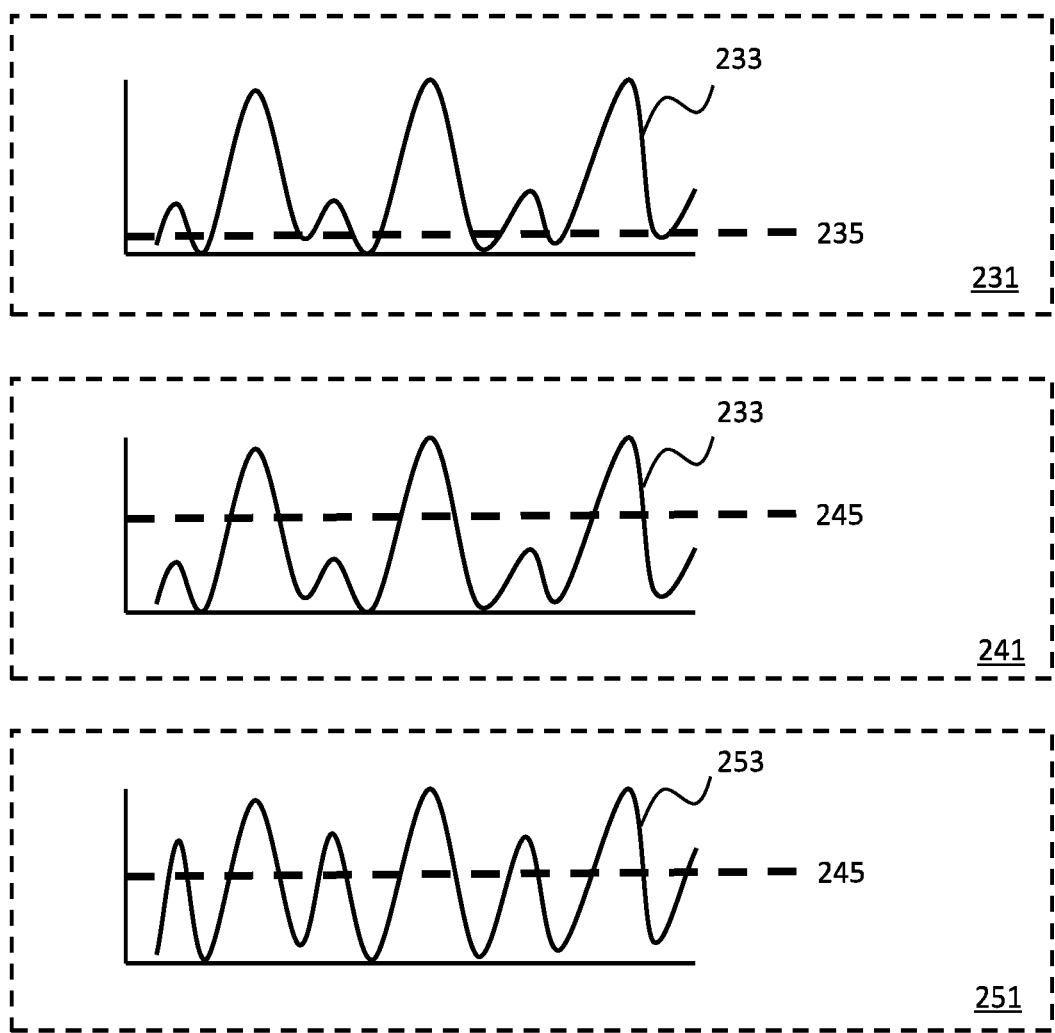
FIG. 13 shows examples of light effects being rendered by an overperforming lighting system and by a partially underperforming lighting system.

Graph 231 of FIG. 13 shows an example of a sequence of light effects 233 being rendered by an overperforming system, i.e. all the light effects exceed the visibility threshold 235. Graph 241 of FIG. 13 shows an example of the sequence of light effects 233 being rendered by a partially underperforming system, i.e. some of the light effects do not exceed the visibility threshold 245. To make sure that all of the light effects are visible, the light intensity levels of the light effects with a light intensity level below the visibility threshold are increased above the visibility threshold, resulting in light effects 253, as shown in graph 251 of FIG. 13.

In the example of FIG. 13, the light intensity levels of the light effects with a light intensity level above the visibility threshold are not increased. However, it is sometimes beneficial to increase the light intensity levels of the light effects with a light intensity level above the visibility threshold. This is beneficial in certain cases, e.g. to allow a system to adjust and harmonize the sparkle level of a dapple effect up to the upper system limit to sustain the dapple effect.

The light intensity levels of the non-sparkling light effects are preferably just above the visibility threshold. To increase a sparkling effect, they may be lowered to just above the visibility threshold in an overperforming system in which the light intensity levels of the sparkling light effects cannot be increased due to upper system limit.

If the ambient light level would rise even further, the dapple effect may drown as a whole, i.e. be flooded by the natural (day) light, with the system thereby becoming underperforming. In such cases, it may be more effective and useful to either drop the dapple effect as a whole or to turn a large part of the dapple effect off, in that only the sparkling component of the content may be dimmed or switched off.

Thus, when the natural light is underperforming, the ambient light conditions offer an opportunity to the artificial system to more easily change and/or provide a semantic meaning of the content played, with the option to either match or to deviate from the natural (day) light (scenes), whereas for overperforming natural light (and open blinds), it is more efficient and natural to go along with the flow, in matching and/or extending the outdoor feel indoors.

The light sensor data is used to harmonize, and if necessary throttle, at least part of the first rhythm towards the ambient light conditions by raising part of the first rhythm above a given system threshold when the system is capable of overperforming, or dropping or partially dropping part of the natural content playing when underperforming. This may be done in different proportions across a day, depending upon the content played as well as the sensed ambient light conditions indoor. This allows an immersive and natural feeling light experience to be sustained at least up to a first performance threshold of the system.

For an underperforming system, the light effects of at least a first portion of the content played, drowning in the ambient light, may be dropped or switched off, and if the artificial content would be completely drowned, the system may automatically decide to play alternative content for which at least a first portion of the content is harmonized to the sensed ambient light conditions (e.g. light level and/or light color).

Figure 14:
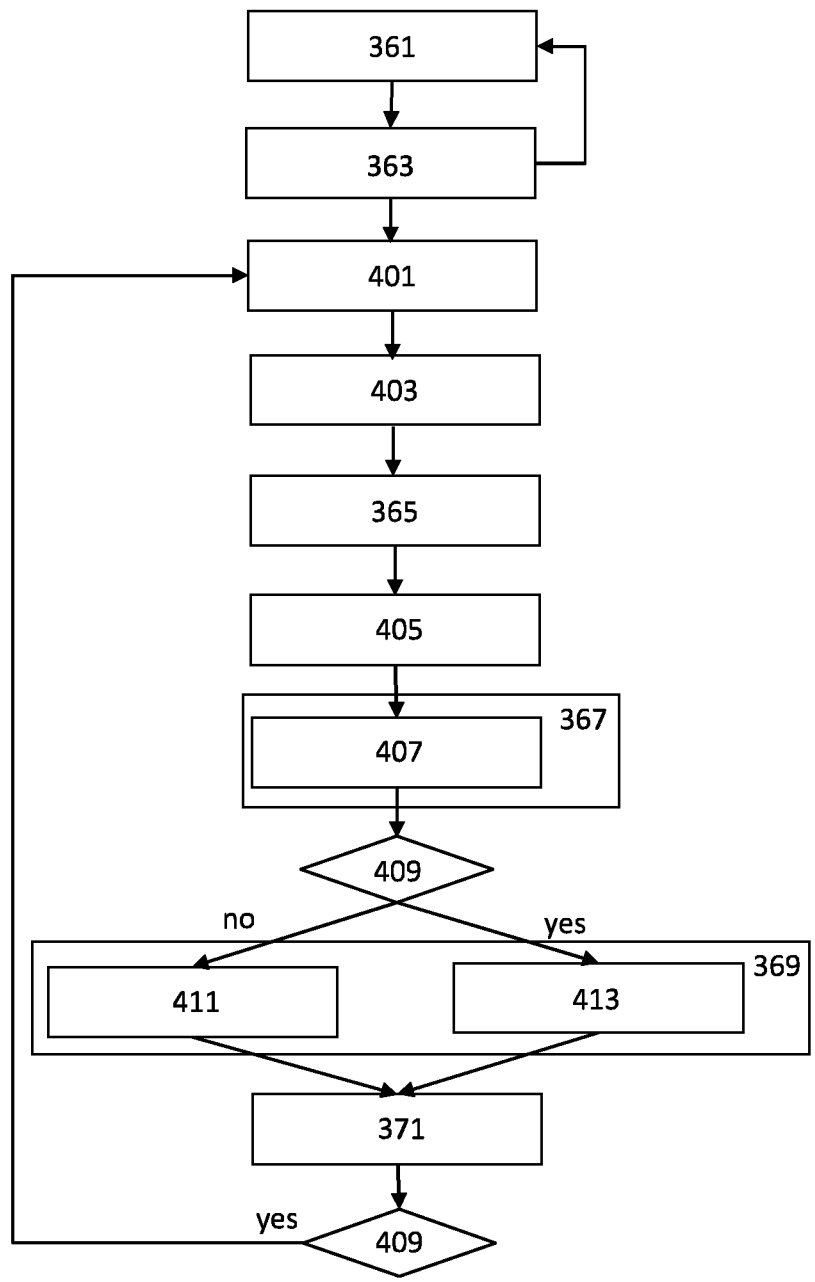
FIG. 14 is a flow diagram of a third embodiment of the method of adjusting at least one light effect based on an ambient light level.

A third embodiment of the method of adjusting at least one light effect based on an ambient light level is shown in FIG. 14. Step 361 comprises receiving light sensor data from one or more light sensors. In the embodiment of FIG. 14, the one or more light sensors are multispectral light sensors and the light sensor data received from the one or more light sensors is spectral light sensor data. The light sensor data is indicative of an ambient light level and is further indicative of an ambient color. A light sensor may be associated with a certain space and/or certain lighting devices. The light sensor is able to distinguish between at least two wavelength regions and may be cyan or blue "centered", for example.

Multispectral light sensors are preferred over conventional light sensors having no spectral selectivity. The spectral differences between sunny and overcast days manifest themselves predominantly in the wavelength range above 460 nm. Below 460 nm, in the blue, changes in the weather are predominantly reflected by the light intensity, whereas during the course of a sunny day, intensity variations across the whole daylight spectrum dominate. Thus, the preference for a cyan comprising sensor is due to cyan being the tipping point for the dependency of spectral power on the weather, i.e. the spectral power of light with a wavelength longer than cyan is more dependent on the weather than the spectral power of light with a wavelength shorter than cyan.

Multispectral light sensors are also deployed in mobile phones, digital cameras and recorders. Spectral selective data allows for the mathematic extraction of the overall light intensity, white balance, CCT, as well as the (relative) spectral contributions of the whole system to the overall light conditions of a given (office) space for at least two or more spectrally different wavelengths (regions), for example by sampling Red and Blue, or Red, Green and Blue or Cyan and Red, or Blue, Cyan and Red, whereas with differential sensing (using two identical sensors) the electronic modulation of the artificial light on top of (near) static ambient (day)light can be easily detected as well.

Pixelated lighting devices can benefit from spectral sensing in that besides for dimming or boosting, spectral selective sensing will also allow for a much more natural feeling representation of the content played. Moreover, the "white" balance of a space can be tracked and corrected for, or be matched (between spaces), during the course of the day. To detect and weigh the (relative (spectral) changes in the (local) ambient light conditions within a space, with respect to the system capabilities of the natural lighting system, at least the spectral data of at least one wavelength (region) selective (light) sensor is fed to a system controller.

Step 363 comprises determining one or more visibility thresholds based on the light sensor data, e.g. one visibility threshold per light sensor. Next, in step 401, a first lighting device is selected from one or more lighting devices that are involved in a certain dynamic light scene. In step 403, the visibility threshold relevant to the selected lighting device is selected from the one or more visibility thresholds determined in step 363.

Then, step 365 comprises determining the plurality of light effects to be rendered by the selected lighting device from the dynamic light scene. A step 405 comprises determining wavelengths of the plurality of light effects determined in step 365 based on the light sensor data. The light sensor data comprises data of at least a first and a second wavelength region, and preferably of at least three different wavelength regions Step 367 is performed after step 405. In the embodiment of FIG. 14, step 367 is implemented by a step 407. Step 407 comprises determining whether any of the light intensity levels of the plurality of dynamic light effects exceed the visibility threshold based on the wavelengths determined in step 405. For example, a green light effect and a yellow light effect may have the same intensity levels, but only the green light effect may be visible under the current ambient lighting conditions.

Next, it is determined in a step 409 whether the lighting device is located in a transition zone, e.g. based on the visibility threshold selected in step 403. If the visibility exceeds a first level and stays below a second level, the lighting device is considered to be located in a transition zone and a step 413 is performed next. Otherwise, a step 411 is performed. Steps 411 and 413 implement step 369.

Steps 411 and 413 comprises increasing the light intensity levels that do not exceed the visibility threshold above the visibility threshold, to harmonize them with the ambient light level. Steps 411 and 413 also comprise adjusting a color value of at least one of the light effects determined in step 365 to harmonize the color value with the ambient color.

For example, one or more of the color components of the dapple effect may be shifted to enhance the immersive light experience in a natural feeling manner. Similarly, the artificial skylight, functional and peripheral/accent lights may also be adjusted, with a part or the whole of the content being shifted to match the spectral distribution of the ambient light, such that a natural-feeling, immersive light-experience is sustained across the space.

In step 413, these light effects are also harmonized with further light effects rendered by a further lighting device, e.g. which is located in a zone adjacent to the transition zone that is closer to a window. Light intensity levels that already exceed the visibility threshold may also be adjusted to harmonize them with the ambient light level and/or to harmonize these light effects with the further light effects.

Step 371 comprises controlling the lighting device to render the plurality of light effects determined in step 365 and adjusted in step 369. Next, a step 409 comprises checking whether there are any further lighting devices involved in the dynamic light scene and if so, selecting the next lighting device and repeating steps 401, 403, 365, 405, 367, 409, 369 and 371 for this next lighting device.

Distributed controllers may render different dynamic light scenes and/or different parts of a dynamic light scene. Each of these distributed controllers may perform the method of FIG. 12, for example. In this case, the light sensor may not only be used to determine the level of the real natural light outside, but also to determine the light intensity levels of dynamic light effects rendered by further lighting devices in adjacent zones.

Alternatively, a dynamic light scene may be rendered on lighting devices located in a larger space by using a central controller, e.g. using the method described in FIG. 14. Each lighting device may be assigned to a zone. Each zone typically comprises one or more light sensors. For example, an artificial transition zone may be created that naturally links the outdoor to one or more different indoor (light) scenes. Thus, artificial transition zones can act as a natural feeling "buffer zone" between either different artificial indoor scenes and/or different artificial indoor and real outdoor scenes. Further away from the windows, an "isle" zone might be created having a different "climate, weather, scenery" than outdoors/near the window.

Figure 15:
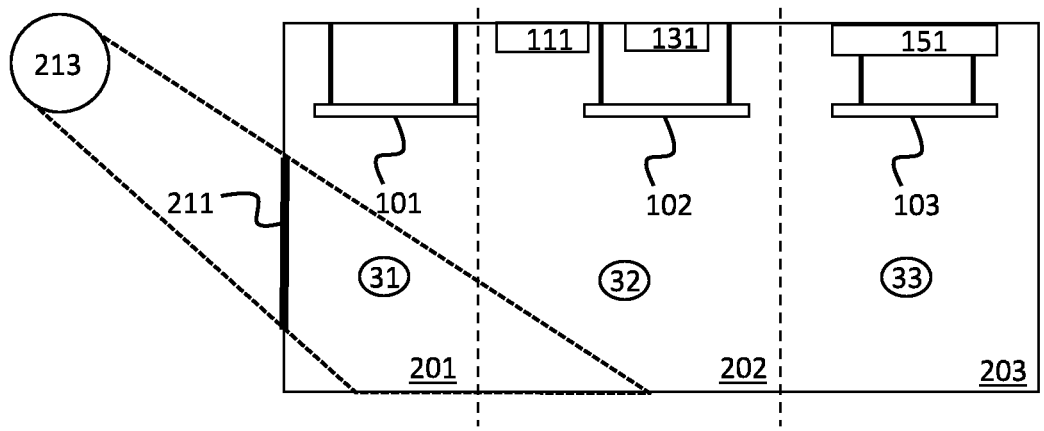
FIGS. 15-17 show examples of ambient and artificial natural lighting illuminating different zones of an office space.
Figure 16:
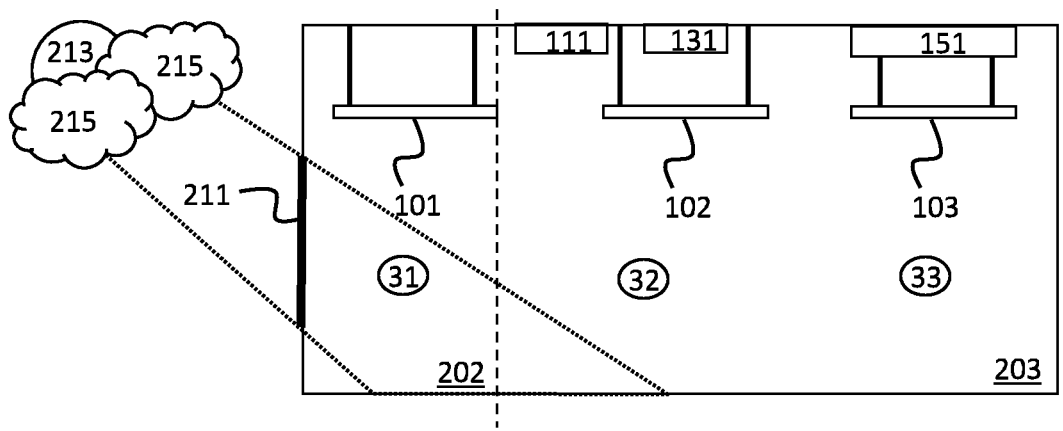
Figure 17:
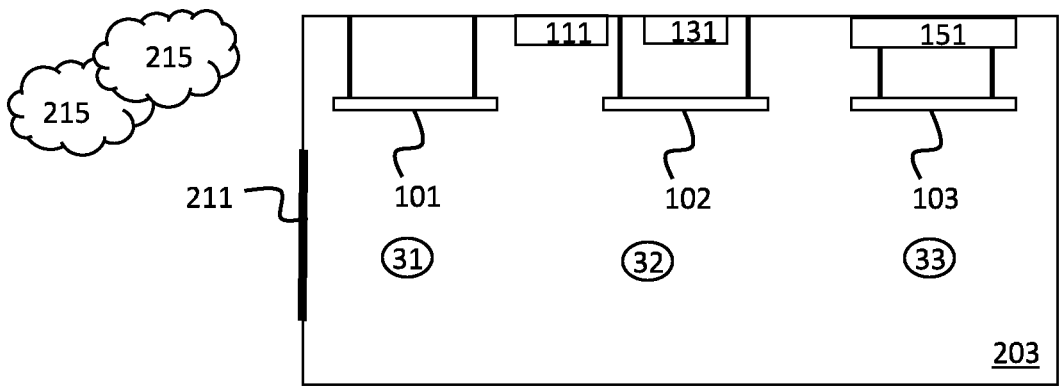

Which zones are created and how large the zones are typically depends on the ambient light conditions, which depend on the weather conditions. FIGS. 15-17 depict three space harmonization options for different ambient light conditions. FIG. 15 depicts sunny weather conditions. In FIG. 15, the zone 201 nearest to the window 211 is made a "go along" zone, because of the unhindered light beams of the sun, represented by reference numeral 213. The go-along zone 201 comprises the peripheral lighting device 101 and light sensor 31 of FIG. 1.

The zone 203 is farthest from the window 211 and therefore made an "isle" zone. An isle zone offers a complete freedom of scenery. Isle zones may be naturally linked with the artificial light scenes running in the inner building spaces and corridors. The isle zone 203 comprises the lighting arrangement 151, the peripheral lighting device 103, and the light sensor 33 of FIG. 1. The zone 202 between go-along zone 201 and isle zone 203 is made a transition zone. Transition zone 202 comprises the functional general lighting device 111, the lighting arrangement 131, the peripheral lighting device 102, and the light sensor 32 of FIG. 1.

FIG. 16 depicts overcast weather conditions, represented by sun 213 and clouds 215. Due to the lower ambient light level, only a transition zone 202 and an isle zone 203 are made. The go-along zone 201 of FIG. 15 is now the transition zone 202 and the transition zone 202 and the isle zone 203 of FIG. 15 are now the isle zone 203.

FIG. 17 depicts cloudy weather conditions, represented by clouds 215. Due to the even lower ambient light level, only an isle zone 203 is made. The go-along zone 201, the transition zone 202 and the isle zone 203 of FIG. 15 are now the isle zone 203.

Besides adapting to outdoor changes (in the (spectral) ambient light conditions), adaption of the indoor rhythms and content playing may also be triggered by other indoor conditions, such as for example furniture or walls of given color(s) and/or reflectivity or vice versa, or the absence thereof. Further, differences in space utilization and/or occupancy may affect the local rhythm, patterns and colors (i.e. content played). In other instances, e.g. in the case of a flickering or blinking light(s) of other device(s) or broken light also present in the same space as the natural lighting system, the content playing may be harmonized towards such lights.

In a situation in which the outdoor light brightens up and the blinds are (still) open, although there is a surplus of ambient light, a device such as an artificial skylight should preferably not be dimmed. Instead, the overall brightness of the sky and (illusion of the) sun should preferably also increase, but in proper relation to the functional light provided by the system. Moreover, to sustain a natural and immersive light experience across the space, the functional light level farther away from the windows may even be boosted (well above the minimum threshold) to improve upon the overall experience. In addition, depending upon the position of the dapple effect(s) in the space, the level of "sparkle" of the dapple effect may automatically be adapted as well. And, in order not to distract the office workers, such changes and adaptations should preferably be smooth and gradual.

The natural lighting system may adapt to other (dis) functional lighting devices within the same space not being part of the natural lighting system, whilst harmonizing the content playing to include the light(s) of the other (dis) functional lights, such that the whole the lighting devices appears to act as one system.

Figure 18:
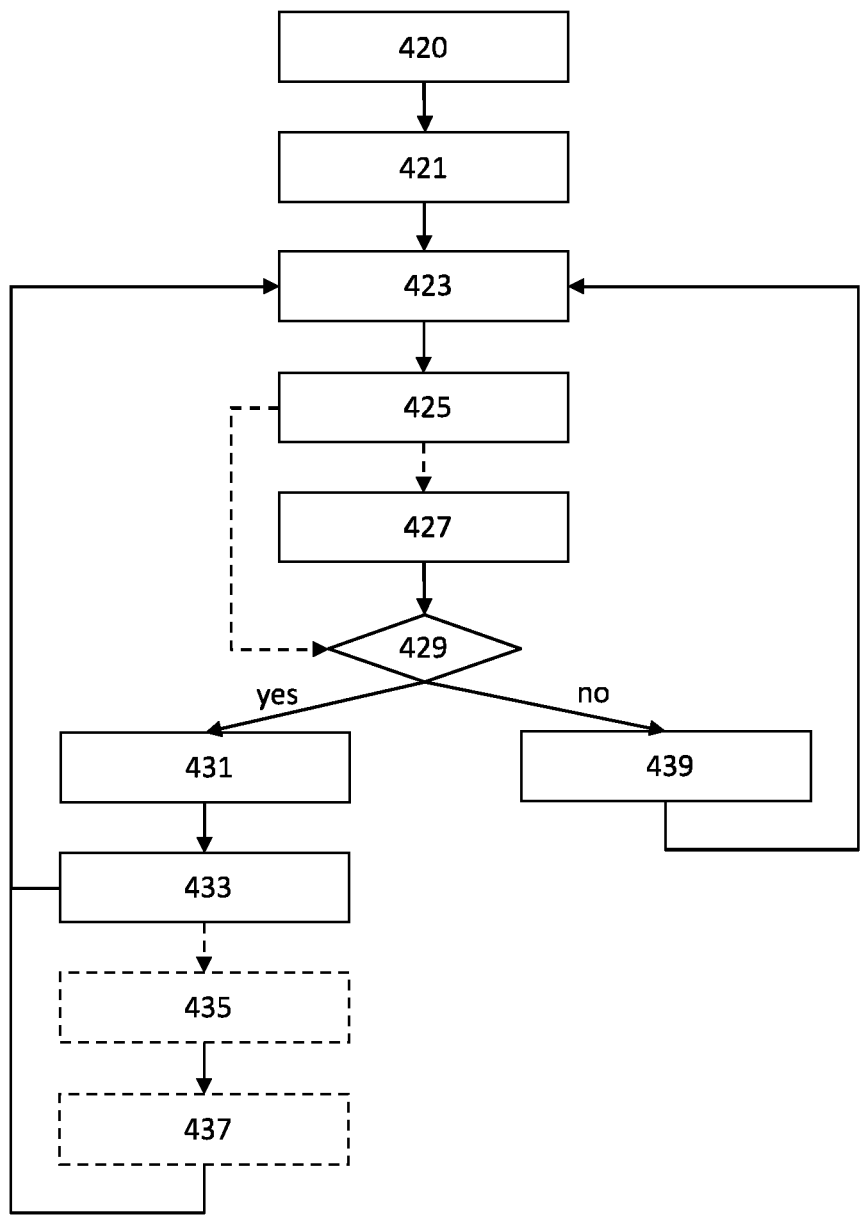
FIG. 18 is a flow diagram of a first embodiment of the method of controlling one or more lighting devices based on a user input signal.

A first embodiment of the method of controlling a plurality of lighting devices to provide an illumination of an environment according to a dynamic light scene is shown in FIG. 18. A step 420 comprises determining a dynamic light scene. The dynamic light scene specifies a temporal sequence of light effects for each of the plurality of lighting devices. A step 421 comprises determining a moment in the sequence at which the rendering should start, e.g. the start of the sequence, to be used in a step 423.

Step 423 comprises determining, from the dynamic light scene, a plurality of light effects to be rendered by one or more of the lighting devices. In the first iteration of step 423, the plurality of light effects determined in step 423 corresponds the moment determined in step 421, e.g. to the start of the dynamic light scene. A step 425 comprises controlling the one or more lighting devices to render the plurality of light effects determined in step 423.

A step 429 comprises checking whether a user input signal has been received in a step 427. In the embodiment of FIG. 18, step 429 is triggered by the user input signal being received or by a certain time having elapsed, i.e. a next moment being reached. This next moment succeeds the moment to which the light effects determined in step 423 correspond. This next moment may be the first moment at which one of the light effects next in the sequence(s) is different, for example. If a user input signal has been received, step 431 is performed next. If not, a step 439 is performed next. Step 439 comprises determining that the next moment should be used in the next iteration of step 423.

Step 431 comprises determining a second moment in the dynamic light scene based on the user input signal. This second moment is different from the moment to which the light effects determined in step 423 correspond, which is referred to as "first moment", and different from the next moment. The user input signal may be indicative of a time difference between the first moment and the second moment. For example, the amount of rotation of a rotary button may indicate this time difference. If the user is only able to go forward in time, the second moment may be determined based only on this time difference.

If the user input signal is also indicative of a desire to go forward in time in the dynamic light scene, e.g. when the rotary button is rotated to the right, or indicative of a desire to go backward in time in the dynamic light scene, e.g. when the rotary button is rotated to the right, the second moment may be determined based on the time difference in combination with the forward/backward indication. A step 433 comprises determining a transition from the first moment to the second moment. The transition is faster than a normal transition from the first moment to the second moment, as specified in the dynamic light scene.

This transition may be immediate or gradual. The transition may be immediate for each lighting device, gradual for each lighting device or immediate for a first subset of the one or more lighting devices and gradual for a second subset of the one or more lighting devices. If the transition is immediate for each lighting device, step 423 is repeated after step 44. In the next iteration of step 423, a plurality of further light effects to be rendered by the one or more lighting devices is determined. This plurality of further light effects corresponds to the second moment in the dynamic light scene. In the next iteration of step 425, the one or more lighting devices are controlled to render this plurality of further light effects. Then, the method proceeds as shown in FIG. 18.

If the transition is gradual for at least one of one or more lighting devices, a step 435 is performed after step 433. Step 435 comprises determining one or more intermediate light effects to be rendered by the second subset of lighting devices. Each of the one or more intermediate light effects corresponds to a moment between the first moment and the second moment in the dynamic light scene. Step 437 comprises controlling the second subset of lighting devices to render the one or more intermediate light effects during the transition. Step 423 is repeated after step 437 in the same way as when it is performed directly after step 433.

Figure 19:
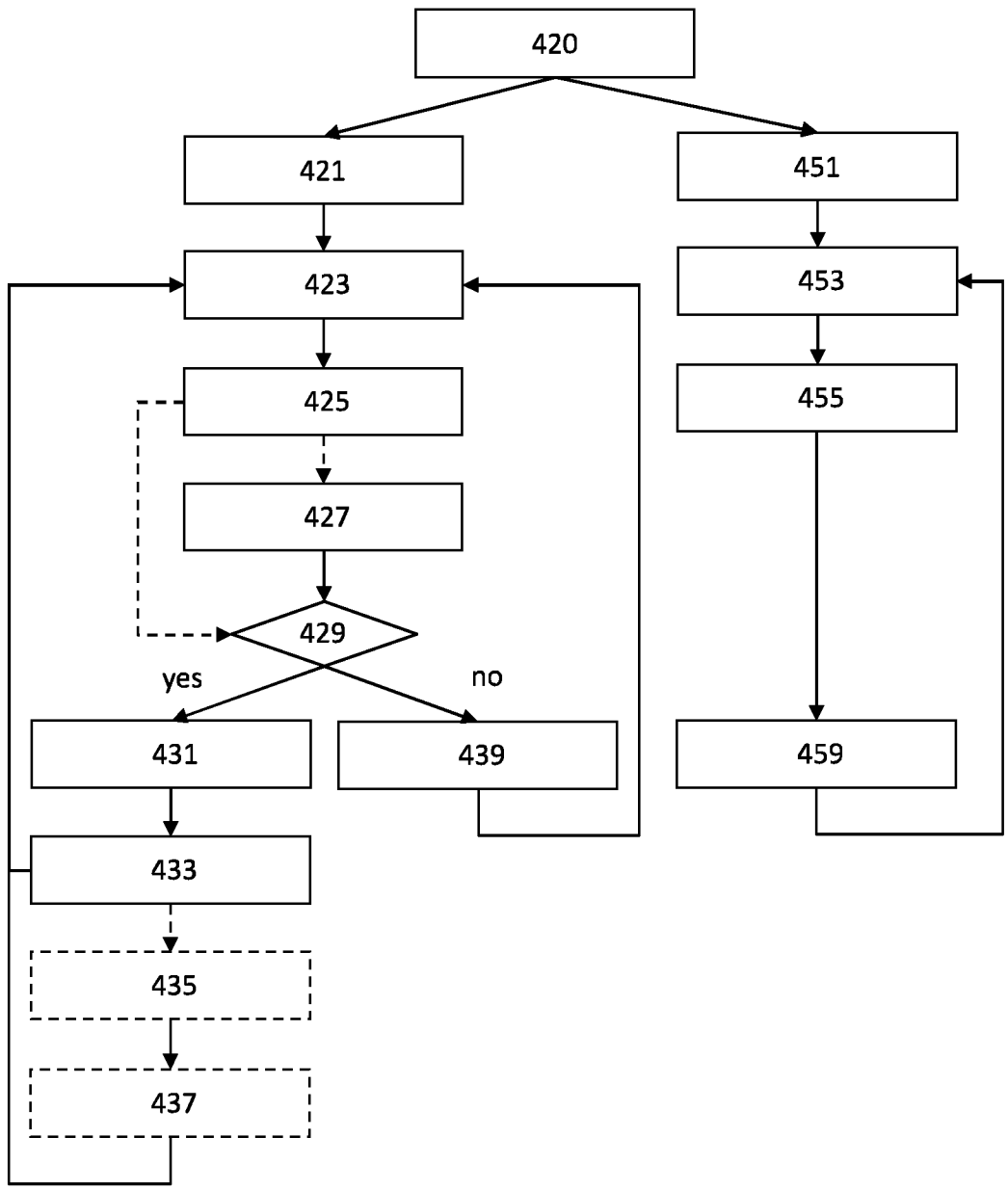
FIG. 19 is a flow diagram of a second embodiment of the method of controlling one or more lighting devices based on a user input signal.

A second embodiment of the method of controlling a plurality of lighting devices to provide an illumination of an environment according to a dynamic light scene is shown in FIG. 19. FIG. 19 is an extension of the embodiment of FIG. 18. In the embodiment of FIG. 19, a step 451 is additionally performed after step 420. A step 451 comprises determining a moment in the sequence at which the rendering should start to be used in a step 453.

Step 453 comprises determining, from the dynamic light scene, a first plurality of light effects to be rendered by at least one other lighting device of the plurality of lighting devices. In the first iteration of step 453, the first plurality of light effects determined in step 453 corresponds the moment determined in step 451. A step 455 comprises controlling the at least one other lighting device to render the first plurality of light effects determined in step 453.

The moment determined in step 451 is different than the moment determined in step 421. If the moment determined in step 421 is the start of the sequence, the moment determined in step 451 is the start of the sequence plus a time difference. This ensures that the light effects rendered in step 425 are delayed compared to the light effects rendered in step 455.

A step 459 comprises determining the next moment that should be used in the next iteration of step 453. This next moment succeeds the moment to which the light effects determined in step 453 correspond. This next moment may be the first moment (after the current moment) at which one of the light effects next in the sequence(s) is different, for example.

In the next iteration of step 453, a second plurality of light effects to be rendered by the at least one lighting device is determined. This second plurality of light effects corresponds to the next moment in the dynamic light scene. In the next iteration of step 455, the at least one lighting device is controlled to render this second plurality of light effects. Then, the method proceeds as shown in FIG. 19.

Since the moment used in step 453 does not depend on the user input signal received in step 427, the user input signal affects the time difference between the moments used in simultaneous iterations of steps 423 and 453, i.e. affects the delay of the light effects rendered in step 425 compared to the light effects rendered in step 455. For example, the user may be able to increase and decrease the dynamics of a dapple effect trail, following the initial dapple effect, in this way.

Figure 20:
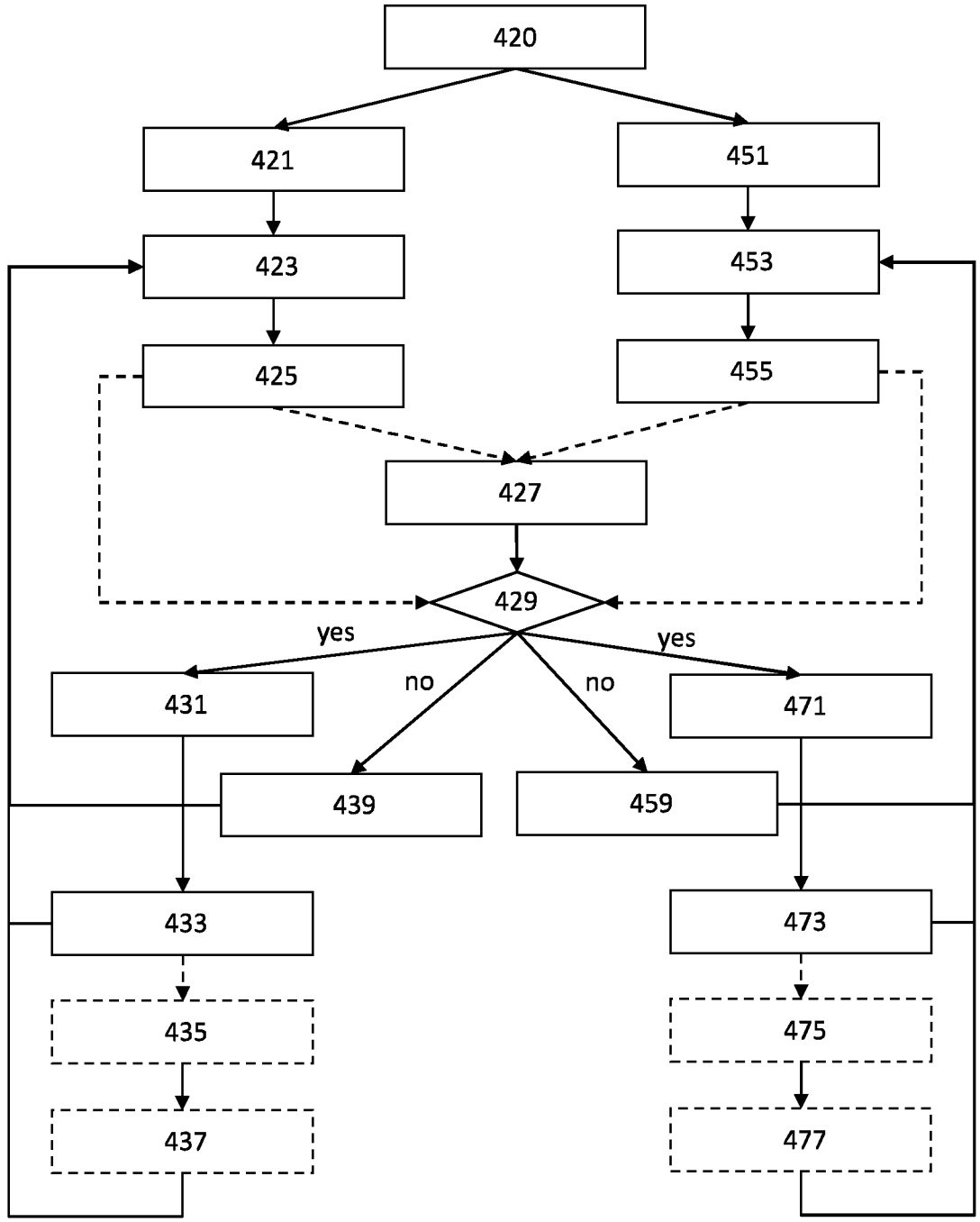
FIG. 20 is a flow diagram of a third embodiment of the method of controlling one or more lighting devices based on a user input signal.

A third embodiment of the method of controlling a plurality of lighting devices to provide an illumination of an environment according to a dynamic light scene is shown in FIG. 20. FIG. 20 is an extension of the embodiment of FIG. 18. In the embodiment of FIG. 20, like in the embodiment of FIG. 19, steps 451, 453 and 455 are additionally performed after step 420. In contrast to the embodiment of FIG. 19, the moment used in next iterations of step 453 depends on the user input signal received in step 427.

If it is determined in step 429 that a user input signal has been received, steps 431 and 471 are performed next. If not, previously described steps 439 and 459 are performed next. Step 471 comprises determining a fourth moment in the dynamic light scene based on the user input signal. This fourth moment is different from the moment to which the light effects determined in step 453 correspond, which is referred to as "third moment", and different from the next moment, which would have been determined if step 459 were to be performed. The fourth moment is also different than the second moment, but a time difference between the first moment and the third moment is equal to a time difference between the second moment and the fourth moment.

Thus, while the second and fourth moment are determined based on the user input signal, the user input signal does not affect the time difference between the moments used in simultaneous iterations of steps 423 and 453, i.e. does not affect the delay of the light effects rendered in step 425 compared to the light effects rendered in step 455.

A step 473 comprises determining a transition from the first moment to the second moment. The transition is faster than a normal transition from the first moment to the second moment, as specified in the dynamic light scene. If the transition is immediate for each lighting device, step 453 is repeated next. In the next iteration of step 453, a second plurality of further light effects to be rendered by the at least one other lighting device is determined. This second plurality of further light effects corresponds to the fourth moment in the dynamic light scene. In the next iteration of step 455, the at least one other lighting device is controlled to render this second plurality of further light effects. Then, the method proceeds as shown in FIG. 20.

If the transition is gradual for one or more of the at least one lighting device, a step 475 is performed after step 473.

Step 475 comprises determining one or more intermediate light effects to be rendered by these one or more lighting devices. Each of the one or more intermediate light effects corresponds to a moment between the third moment and the fourth moment in the dynamic light scene. Step 477 comprises controlling the one or more lighting devices to render the one or more intermediate light effects during the transition. Step 453 is repeated after step 477 in the same way as when it is performed directly after step 473.

Figure 21:
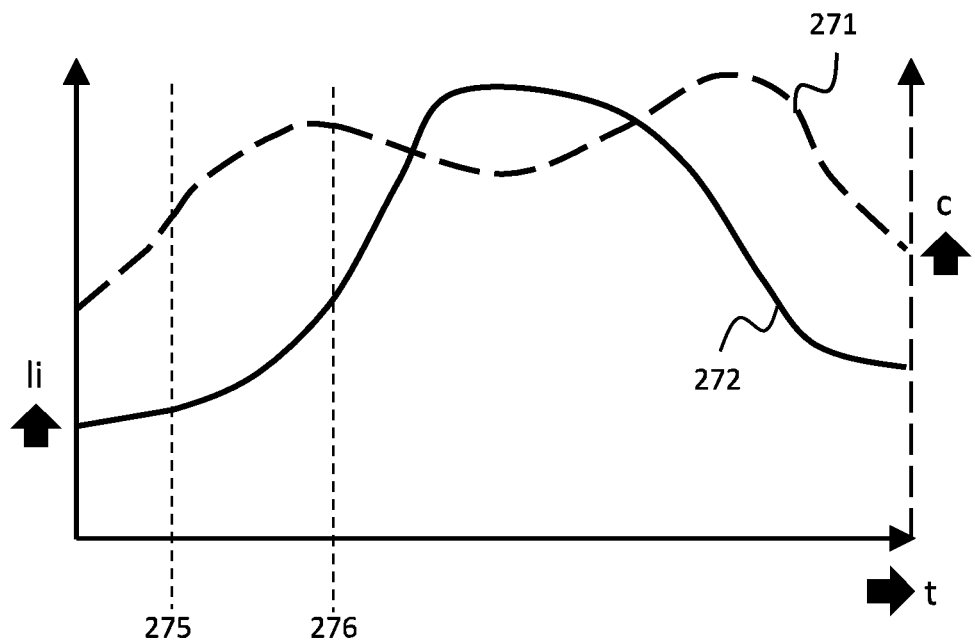
FIG. 21 shows an example of a dynamic light scene comprising color and lighting intensity settings.

FIG. 21 shows an example of a dynamic light scene comprising color (c) settings 271 and lighting intensity (li) settings 272. At a first moment 275, a user input signal is received. The user input signal is indicative of a desire to go forward in time to a second moment 276.

Figure 22:
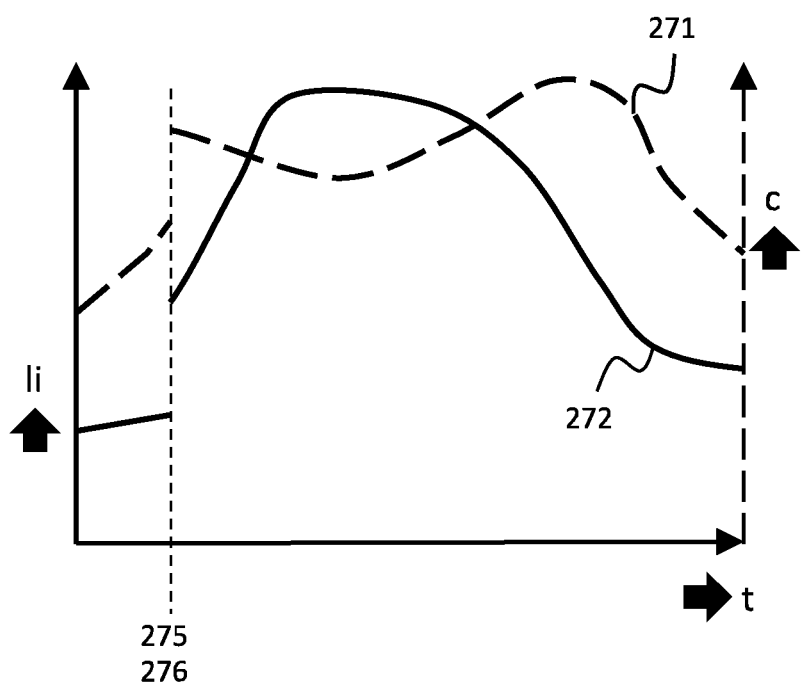
FIGS. 22-23 show examples of the dynamic light scene of FIG. 21 being partially rendered.
Figure 23:
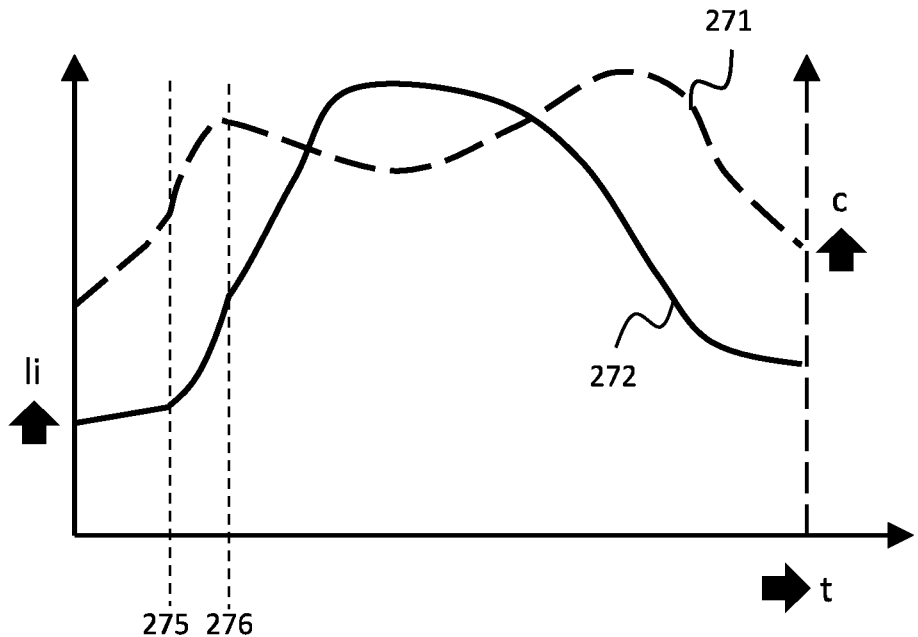

FIGS. 22-23 show examples of the dynamic light scene of FIG. 21 being partially rendered. FIG. 22 shows an immediate transition. The light settings specified for the second moment 276 in the dynamic light scene of FIG. 21 are rendered directly after the light settings specified for the first moment 275 have been rendered. FIG. 23 shows a gradual transition. The duration of this gradual transition is faster than the normal transition from the first moment 275 to the second moment 276, as specified in the dynamic light scene. The gradual transition may take a few seconds to a few minutes, for example. The transition may be linear or may have a similar shape as the function encompassing the light settings between the first moment 275 and the second moment 276, as specified in the dynamic light scene, for example. The latter is shown in FIG. 23.

The embodiments of FIGS. 9 to 12, 14, and 18 to 20 differ from each other in multiple aspects, i.e. multiple steps have been added, omitted and/or replaced. In variations on these embodiments, only a subset of these steps is added, omitted and/or replaced. For example, the embodiments of FIGS. 9, 10, 11 and 18 may be combined.

Figure 24:
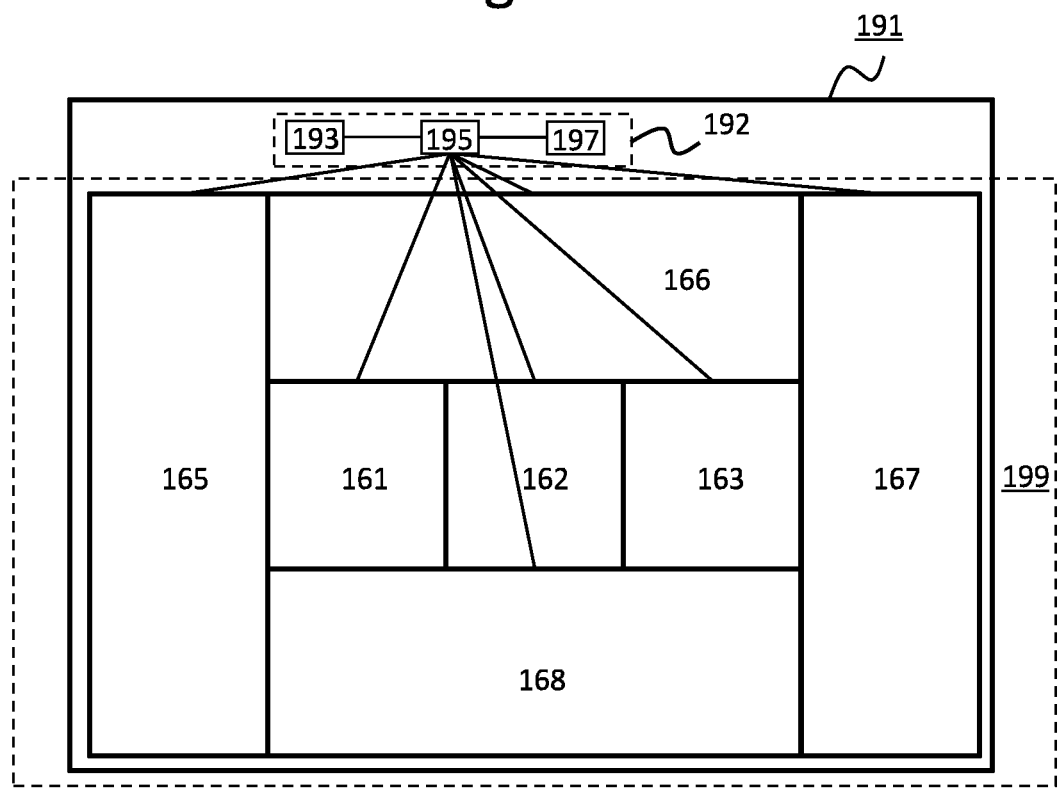
FIG. 24 is a block diagram of a third alternative embodiment of the lighting arrangement of FIG. 2.

A third alternative embodiment of the lighting arrangement 151 of FIG. 2 is shown in FIG. 24. A lighting device 191 comprises a lighting arrangement 199 and a controller 192. The lighting arrangement 199 comprises artificial skylights 161-163 and functional general lighting devices 166 and 168 for providing horizontal light. The functional general lighting devices 166 and 168 each comprise a horizontal luminous surface. The functional general lighting devices 166 and 168 are positioned in parallel and adjacent to the artificial skylights 161-163.

A spacing between the functional general lighting devices 166 and 168 and the artificial skylights 161-163 does not exceed the width of the artificial skylights 161-163. The lighting arrangement 199 further comprises artificial edge functional general lighting devices 165 and 167 for providing horizontal light. The edge functional general lighting devices 165 and 167 each comprising a horizontal luminous surface.

The controller 192 comprises a processor 195, a transceiver 193 and a memory 197. The controller 192 is configured to control the artificial skylights 161-163, the functional general lighting devices 166 and 168 and the edge general lighting devices 165 and 167 to render different light effects of a dynamic light scene. The dynamic light scene specifies a temporal sequence of light effects for each of a plurality of lighting devices. The plurality of lighting devices includes the artificial skylights 161-163, the functional general lighting devices 166 and 168 and the edge general lighting devices 165 and 167.

In the embodiment of the lighting device 191 shown in FIG. 24, the lighting device 191 comprises one processor 195. In an alternative embodiment, the lighting device 191 comprises multiple processors. The processor 195 of the lighting device 191 may be an application-specific processor, for example. The transceiver 193 may use one or more wireless communication technologies. e.g. Zigbee, for communicating with an external controller. In an alternative embodiment, multiple receivers and/or multiple transmitters are used instead of a single transceiver.

In the embodiment shown in FIG. 24, a receiver and a transmitter are combined into a transceiver, transceiver 193. In an alternative embodiment, a separate receiver and a separate transmitter are used. The artificial skylights 161, the functional general lighting devices 166 and 168 and the edge general lighting devices 165 and 167 each comprise a plurality of LEDs. The LEDs may be direct emitting or phosphor converted LEDs. The lighting device 191 may comprise other components typical for a connected lighting device such as a power connector. In an alternative embodiment, the lighting device 191 is not a connected lighting device. The invention may be implemented using a computer program running on one or more processors.

Figure 25:
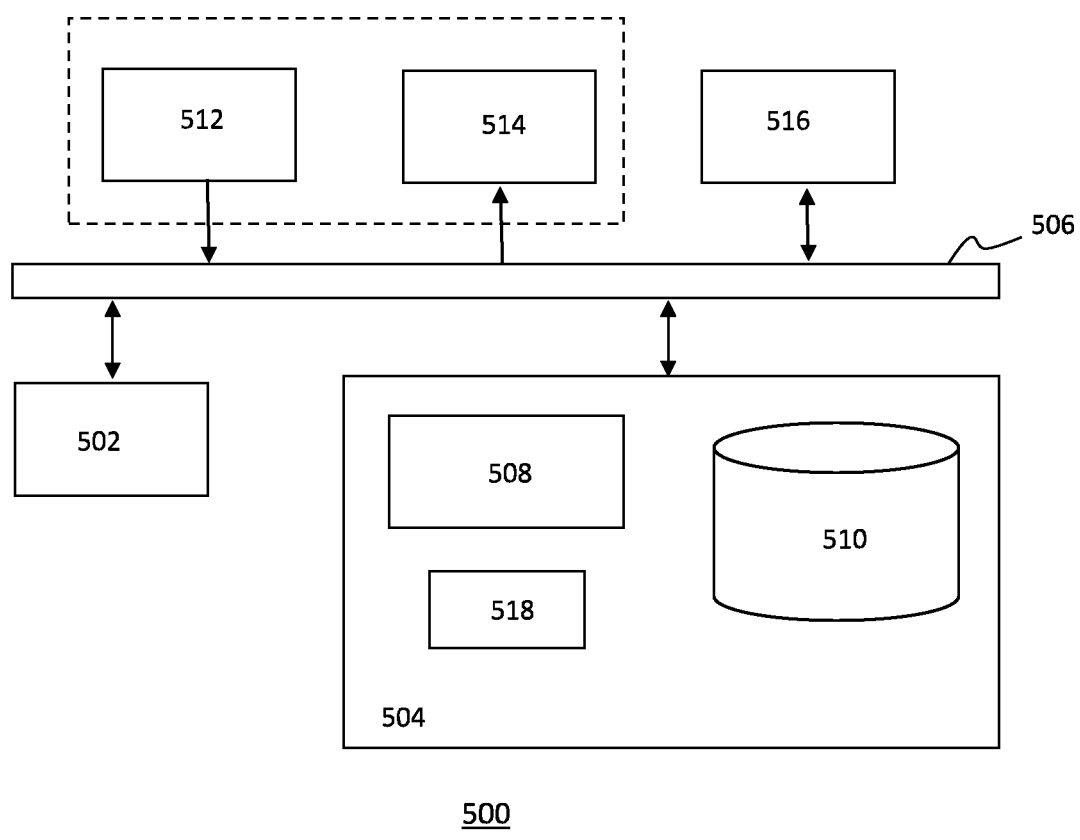
FIG. 25 is a block diagram of an exemplary data processing system for performing the method of the invention.

FIG. 25 depicts a block diagram illustrating an exemplary data processing system that may perform the method as described with reference to FIGS. 9 to 12, 14, and 18 to 20.

As shown in FIG. 25, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that is capable of performing the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the quantity of times program code must be retrieved from the bulk storage device 510 during execution. The processing system 500 may also be able to use memory elements of another processing system, e.g. if the processing system 500 is part of a cloud-computing platform.

Input/output (I/O) devices depicted as an input device 512 and an output device 514 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 25 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 500.

As pictured in FIG. 25, the memory elements 504 may store an application 518. In various embodiments, the application 518 may be stored in the local memory 508, the one or more bulk storage devices 510, or separate from the local memory and the bulk storage devices. It should be appreciated that the data processing system 500 may further execute an operating system (not shown in FIG. 25) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

FIG. 25 shows the input device 512 and the output device 514 as being separate from the network adapter 516. However, additionally or alternatively, input may be received via the network adapter 516 and output be transmitted via the network adapter 516. For example, the data processing system 500 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A lighting system comprising:
a controller for controlling a lighting arrangement comprising an artificial skylight and a functional general lighting device, and
said lighting arrangement, wherein:
said artificial skylight comprises a light emitting surface and a light emitting inner rim surrounding said light emitting surface, said light emitting inner rim being perpendicular to said light emitting surface,
said functional general lighting device comprises a horizontal luminous surface for providing horizontal light,
said functional general lighting device being positioned in a parallel plane with said artificial skylight and adjacent to said artificial skylight, and wherein a spacing between said functional general lighting device and said artificial skylight does not exceed the width of said artificial skylight,
said controller is configured to control said artificial skylight and said functional general lighting device to render light effects of a dynamic light scene, said dynamic light scene specifying a temporal sequence of light effects, and
said controller is configured to control said artificial skylight to render blue and/or cyan light and control said functional general lighting device to render light with a color temperature between 4000 Kelvin and 5500 Kelvin.

2. The lighting system as claimed in claim 1, wherein said controller is configured to control at least part of said light emitting inner rim to match said color temperature rendered by said functional general lighting device.

3. The lighting system as claimed in claim 1, wherein said lighting arrangement is configured to be installed within an existing suspended ceiling grid and/or to be suspended from a ceiling.

4. The lighting system as claimed in claim 1, wherein the width of said functional general lighting device is at least half of the width of said artificial skylight.

5. The lighting system as claimed in claim 1, wherein said lighting system further comprises a peripheral lighting device for providing dynamic and vertical illumination and wherein said controller is configured to control said artificial skylight, said functional general lighting device and said peripheral lighting device to each render a different light effects of said dynamic light scene.

6. The lighting system as claimed in claim 5, wherein said peripheral lighting device is attached to or suspended from said lighting arrangement.

7. The lighting system as claimed in claim 1, wherein said spacing between said functional general lighting device and said artificial skylight does not exceed five centimeters.

8. The lighting system as claimed in claim 1, wherein said lighting arrangement comprises a further artificial skylight and said functional general lighting device is positioned in parallel and adjacent to said further artificial skylight, a spacing between said functional general lighting device and said further artificial skylight not exceeding the width of said further artificial skylight.

9. The lighting system as claimed in claim 1, wherein said lighting arrangement comprises a further functional general lighting device, said further functional general lighting device being positioned in parallel and adjacent to said artificial skylight on a different side than said functional general lighting device and a spacing between said further functional general lighting device and said artificial skylight not exceeding the width of said artificial skylight.

10. The lighting system as claimed in claim 1, wherein said lighting arrangement comprises a first edge functional general lighting device adjacent to a first end of said artificial skylight in the length direction and/or a second edge functional general lighting device adjacent to a second end of said artificial skylight in the length direction.

11. The lighting system as claimed in claim 1, wherein said inner rim comprises a hard shadow mask or said controller is configured to control said artificial skylight, to render a shadow effect along at least part of said inner rim.

12. A method of controlling a lighting arrangement, said method comprising:
controlling an artificial skylight and a functional general lighting device to render light effects of a dynamic light scene, said dynamic light scene specifying a temporal sequence of light effects;
controlling said artificial skylight to render blue and/or cyan light; and
controlling said functional general lighting device to render light with a color temperature between 4000 Kelvin and 5500 Kelvin.

13. The method of controlling a lighting arrangement as claimed in claim 12, wherein said method further comprises:
controlling at least part of said light emitting inner rim to match said color temperature rendered by said functional general lighting device.

14. A non-transitory readable medium comprising at least one software code portion, the at least one software code portion, when run on a computer system, causing the computer to perform the method according to claim 12.

* * * * *